(12) United States Patent
Zhou

(10) Patent No.: US 8,086,273 B2
(45) Date of Patent: Dec. 27, 2011

(54) WIRELESS COMMUNICATION METHOD, WIRELESS COMMUNICATION SYSTEM, AND WIRELESS COMMUNICATION APPARATUS

(75) Inventor: Liang Zhou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 12/748,766

(22) Filed: Mar. 29, 2010

(65) Prior Publication Data

US 2010/0248656 A1 Sep. 30, 2010

(30) Foreign Application Priority Data

Mar. 30, 2009 (JP) ................................. 2009-081191
Feb. 9, 2010 (JP) ................................. 2010-026572

(51) Int. Cl.
*H04M 1/00* (2006.01)
*H03C 7/02* (2006.01)

(52) U.S. Cl. ..................... 455/562.1; 455/101; 455/102; 455/103

(58) Field of Classification Search ............... 455/562.1, 455/101, 102, 103, 500, 550.1, 553.1, 560, 455/575.7, 129, 132, 133, 137, 140; 375/147, 375/260, 267, 299, 347, 349; 370/208, 210, 370/465
See application file for complete search history.

(56) References Cited

U.S. PATENT DOCUMENTS

| 6,862,271 | B2* | 3/2005 | Medvedev et al. | 370/329 |
| 7,463,577 | B2* | 12/2008 | Sudo et al. | 370/208 |
| 7,643,404 | B2* | 1/2010 | Li et al. | 370/208 |
| 7,839,842 | B2* | 11/2010 | Zhang et al. | 370/380 |
| 7,852,906 | B2* | 12/2010 | Zhou et al. | 375/147 |
| 7,873,113 | B2* | 1/2011 | Takano et al. | 375/267 |
| 2005/0002326 | A1* | 1/2005 | Ling et al. | 370/208 |
| 2008/0130790 | A1* | 6/2008 | Forenza et al. | 375/299 |
| 2009/0285325 | A1* | 11/2009 | Zhou | 375/267 |
| 2011/0150117 | A1* | 6/2011 | Zhou et al. | 375/260 |
| 2011/0190020 | A1* | 8/2011 | Zhou | 455/517 |

FOREIGN PATENT DOCUMENTS

| JP | 2007-006258 | 1/2007 |
| JP | 2007-013455 | 1/2007 |
| JP | 2007-013547 | 1/2007 |

* cited by examiner

*Primary Examiner* — Pablo Tran

(74) *Attorney, Agent, or Firm* — Katten Muchin Rosenman LLP

(57) ABSTRACT

A wireless communication method MIMO communication using a wireless communication apparatus having N antennas includes performing first inverse-matrix determining processing which determines, using a channel matrix for a first antenna selected from the N antennas, a first inverse matrix of the channel matrix; performing second inverse-matrix determining processing which determines, with respect to a (n+1) th antenna selected from antennas other than the first to nth antennas already selected, a second inverse matrix of a channel matrix for a group of the first to (n+1)th antennas, by performing computation using a value from one of the first inverse matrix and the second inverse matrix, and performing communication using, from a plurality of combinations of the L antennas selected from the N antennas, a combination of L antennas with which an inverse matrix value determined in the first and second inverse-matrix determining processing satisfies an antenna selection criterion.

16 Claims, 14 Drawing Sheets

FOR SELECTION OF 3 TRANSMIT ANTENNAS FROM 5 TRANSMIT ANTENNAS (a) SELECTION OF FIRST TRANSMIT ANTENNA

TRANSMIT ANTENNA 1 → SELECT
    TRANSMIT ANTENNA 2
    TRANSMIT ANTENNA 3
    TRANSMIT ANTENNA 4
    TRANSMIT ANTENNA 5

(b) SELECTION OF SECOND TRANSMIT ANTENNA

TRANSMIT ANTENNA 1 2
    TRANSMIT ANTENNA 1 3 → SELECT
    TRANSMIT ANTENNA 1 4
    TRANSMIT ANTENNA 1 5

(C) SELECTION OF THIRD TRANSMIT ANTENNA

TRANSMIT ANTENNA 1 3 2
    TRANSMIT ANTENNA 1 3 4
    TRANSMIT ANTENNA 1 3 5 → SELECT

FIG. 4

FOR SELECTION OF 3 TRANSMIT ANTENNAS FROM 5 TRANSMIT ANTENNAS (a) SELECTION OF FIRST TRANSMIT ANTENNA

TRANSMIT ANTENNA 1 → SELECT
TRANSMIT ANTENNA 2
TRANSMIT ANTENNA 3
TRANSMIT ANTENNA 4
TRANSMIT ANTENNA 5

(b) SELECTION OF SECOND TRANSMIT ANTENNA

TRANSMIT ANTENNA 1 2
TRANSMIT ANTENNA 1 3 → SELECT
TRANSMIT ANTENNA 1 4
TRANSMIT ANTENNA 1 5

(C) SELECTION OF THIRD TRANSMIT ANTENNA

TRANSMIT ANTENNA 1 3 2
TRANSMIT ANTENNA 1 3 4
TRANSMIT ANTENNA 1 3 5 → SELECT

FIG. 7

FOR SELECTION OF 3 TRANSMIT ANTENNAS FROM 5 TRANSMIT ANTENNAS ... TEN SUBSETS 1 TO 10

|  | TRANSMIT ANTENNAS | | |
|---|---|---|---|
| SUBSET 1 | 1 | 2 | 3 |
| SUBSET 2 | 1 | 2 | 4 |
| SUBSET 3 | 1 | 2 | 5 |
| SUBSET 4 | 1 | 3 | 4 |
| SUBSET 5 | 1 | 3 | 5 |
| SUBSET 6 | 1 | 4 | 5 |
| SUBSET 7 | 2 | 3 | 4 |
| SUBSET 8 | 2 | 3 | 5 |
| SUBSET 9 | 2 | 4 | 5 |
| SUBSET 10 | 3 | 4 | 5 |

FIG. 10

FOR SELECTION OF 7 TRANSMIT ANTENNAS FROM 8 TRANSMIT ANTENNAS
... EIGHT SUBSETS 1 TO 8

TRANSMIT ANTENNAS

| | | | | | | | |
|---|---|---|---|---|---|---|---|
| SUBSET 1 | 1 | 2 | 3 | 4 | 5 | 6 | 7 |
| SUBSET 2 | 1 | 2 | 3 | 4 | 5 | 6 | 8 |
| SUBSET 3 | 1 | 2 | 3 | 4 | 5 | 7 | 8 |
| SUBSET 4 | 1 | 2 | 3 | 4 | 6 | 7 | 8 |
| SUBSET 5 | 1 | 2 | 3 | 5 | 6 | 7 | 8 |
| SUBSET 6 | 1 | 2 | 4 | 5 | 6 | 7 | 8 |
| SUBSET 7 | 1 | 3 | 4 | 5 | 6 | 7 | 8 |
| SUBSET 8 | 2 | 3 | 4 | 5 | 6 | 7 | 8 |

WIRELESS COMMUNICATION METHOD, WIRELESS COMMUNICATION SYSTEM, AND WIRELESS COMMUNICATION APPARATUS

CROSS-REFERENCE TO RELATED APPLICATION

This application is based upon and claims the benefit of priority of the prior Japanese Patent Applications No. 2009-81191, filed on Mar. 30, 2009 and No. 2010-26572, filed on Feb. 9, 2010, the entire contents of which are incorporated herein by reference.

FIELD

Embodiments of the present invention relate to a technology used for a wireless communication system that is capable of performing multiple-input multiple-output (MIMO) communication.

BACKGROUND

In recent years, in wireless communication systems, a MIMO communication technology has been proposed as a technology for achieving an increase in transmission speeds, an increase in communication capacities, an improvement in reception qualities, and so on. In the MIMO communication technology, a transmitter having multiple antennas and a receiver having multiple antennas are used. Independent data streams are transmitted from the antennas of the transmitter and are received by the antennas of the receiver. On the basis of the received signals, the receiver separates the transmission signals (the data streams) that are mixed on propagation channels, by using channel matrices representing the state (environment) of communication channels.

In the wireless communication system, as the number of antennas increases, a greater number of signals are transmitted and received for processing. Thus, for example, the cost, size, and power consumption of circuitry coupled to the antennas increase and the complexity of the entire system also increases. Thus, in order to reduce the cost, the complexity, and so on, a technology for selecting a combination of antennas used from all the antennas has been proposed (refer to, for example, Japanese Unexamined Patent Application Publication No. 2007-13547).

During selection of the antenna combination, the wireless communication system selects an appropriate antenna combination that allows high-level communication performance (e.g., a high-level communication capacity and a diversity gain) to be maintained. However, a selection criterion for selecting an appropriate antenna combination is highly complicated in general. In addition, as the number of antennas provided increases, the number of antenna combinations also increases. Thus, processing for selecting an appropriate antenna combination from all combinations becomes complicated and a large amount of processing time is required.

SUMMARY

According to an aspect of the embodiments discussed herein, a wireless communication method that is capable of performing multiple-input multiple-output communication using a wireless communication apparatus having N antennas (N is an integer of 2 or greater), includes performing first inverse-matrix determining processing which determines, using a channel matrix for a first antenna selected from the N antennas, a first inverse matrix of the channel matrix; performing second inverse-matrix determining processing which determines, with respect to an (n+1)th antenna selected from antennas other than the first to nth antennas already selected from the N antennas (where n=1, 2, . . . , up to L−1, and L represents a given number of antennas for use and is an integer of 2 or greater and smaller than or equal to N), a second inverse matrix of a channel matrix for a group of the first to (n+1)th antennas, by performing computation using a value from one of the first inverse matrix and the second inverse matrix of a channel matrix for a group of the first to nth antennas; and performing communication using, from a plurality of combinations of the L antennas selected from the N antennas, a combination of L antennas with which an inverse matrix value determined in the first and second inverse-matrix determining processing satisfies an antenna selection criterion.

It is to be understood that both the foregoing general description and the following detailed description are exemplary and explanatory and are not restrictive of the embodiments, as claimed.

BRIEF DESCRIPTION OF DRAWINGS

FIG. 4 illustrates antenna selection processing in FIG. 3;

FIG. 7 illustrates antenna selection processing of the wireless communication system according to a second embodiment;

FIG. 10 illustrates antenna selection processing of the fourth embodiment;

DESCRIPTION OF EMBODIMENTS

Embodiments of a wireless communication method, a wireless communication system, and a wireless communication apparatus according to the present disclosure will be described below with reference to the accompanying drawings.

First Embodiment

Figure 1:
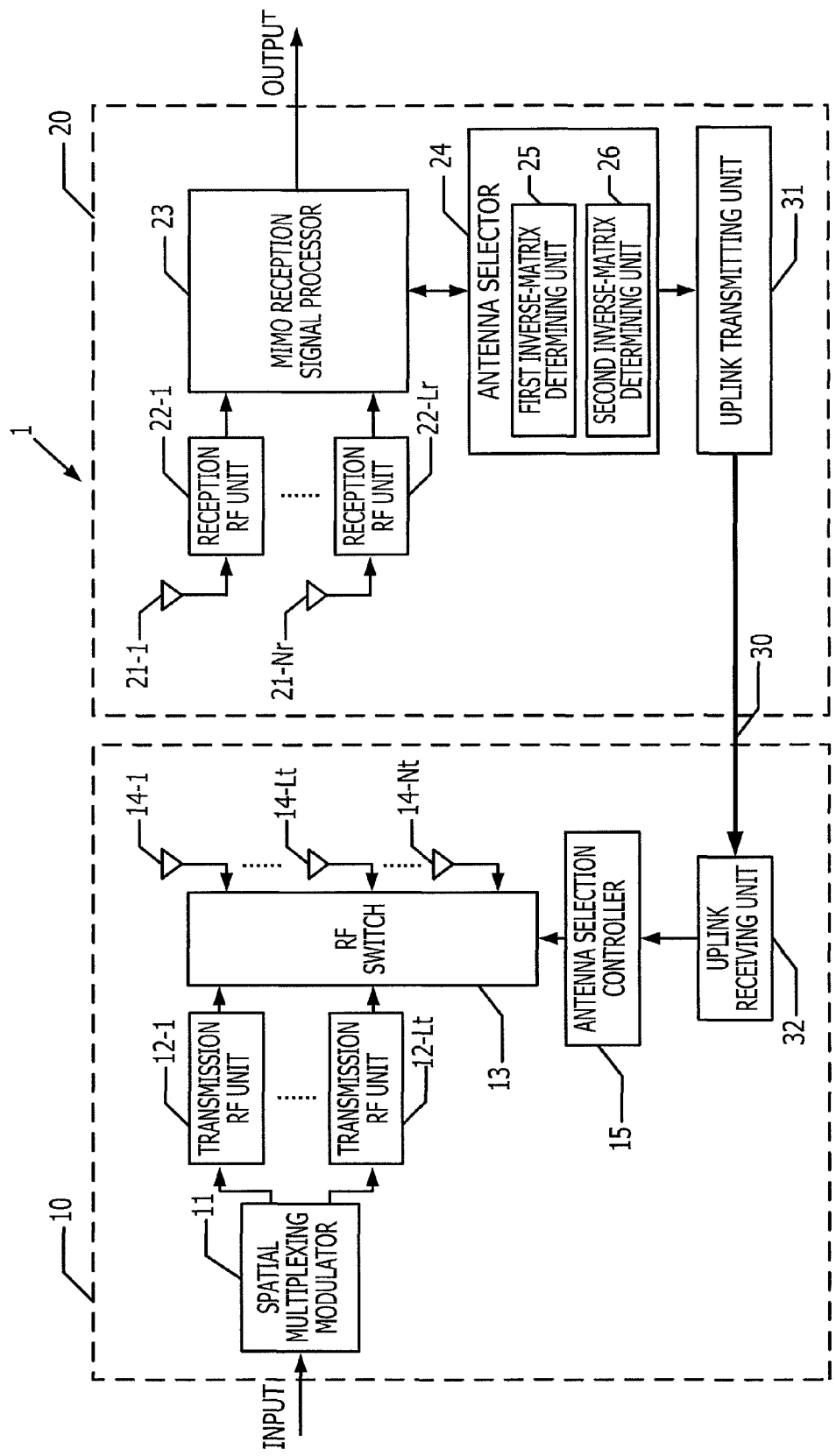
FIG. 1 is a block diagram of a wireless communication system according to a first embodiment.

A first embodiment will first be described with reference to FIGS. 1 to 6. FIG. 1 is a block diagram illustrating a wireless communication system 1 according to the first embodiment. The wireless communication system 1 illustrated in FIG. 1 is one example of the wireless communication system according to the present disclosure and is capable of performing MIMO communication. The wireless communication system 1 includes at least one base station 10 and at least one mobile station 20. The base station 10 serves as a wireless communication apparatus (a transmitter) at a transmitting end and the mobile station 20 serves as a wireless communication apparatus (a receiver) at a receiving end.

The base station 10 includes a spatial multiplexing modulator 11, $L_t$ transmission RF (radio frequency) units 12-1 to 12-$L_t$ (where 4 is an integer of 2 or greater), an RF switch 13, $N_t$ transmit antennas 14-1 to 14-$N_t$ (where $N_t$ is an integer of 2 or greater, and is greater than $L_t$), and an antenna selection controller 15. The 4 transmission RF units 12-1 to 12-$L_t$ may hereinafter be referred to as "transmission RF units 12", unless they are to be distinguished from each other, and the transmit antennas 14-1 to 14-$N_t$ may hereinafter be referred to as "transmit antennas 14", unless they are to be distinguished from each other. The provision of the $L_t$ transmission RF units 12 indicates that the number of transmission data streams that may be processed by the base station 10 at one time is $L_t$. The base station 10 selects $L_t$ antennas from the $N_t$ antennas and performs transmission using the $L_t$ antennas.

The mobile station 20 includes $N_r$ receive antennas 21-1 to 21-$N_r$ (where $N_r$ is an integer of 2 or greater), $L_r$ reception RF units 22-1 to 22-$L_r$ (where $L_r$ is an integer of 2 or greater, and is smaller than or equal to $N_r$), a MIMO reception signal processor 23, and an antenna selector 24. The receive antennas 21-1 to 21-$N_r$ may hereinafter be referred to as "receive antennas 21", unless they are to be distinguished from each other, and the reception RF units 22-1 to 22-4 may hereinafter be referred to as "reception RF units 22", unless they are to be distinguished from each other. The provision of the $L_r$ reception RF units 22 indicates that the number of reception data streams that may be processed by the base station 20 at one time is $L_r$. In the first embodiment, it is assumed that the number $N_r$ of receive antennas 21 is the same as $L_r$ and all the receive antennas 21 are used to perform reception. It is also assumed hereinafter that the number $L_r$ of reception data streams and the number $L_t$ of transmission data streams are the same L.

In addition, the base station 10 includes an uplink receiving unit 32 and the mobile station 20 includes an uplink transmitting unit 31. As one of uplink channels from the uplink transmitting unit 31 in the mobile station 20 to the uplink receiving unit 32 in the base station 10, a feedback channel 30 is provided between the base station 10 and the mobile station 20. The feedback channel 30 is used to transfer information, such as antenna indices and so on described below.

Transmission data is input to the spatial multiplexing modulator 11 in the base station 10. The spatial multiplexing modulator 11 performs given error-correction coding on the input transmission data to obtain a series of encoded data, modulates the series of encoded data by performing mapping based on a given modulation scheme, and outputs resulting L transmission data streams. One example of the given error-correction coding is turbo coding. Examples of the given modulation scheme include a QPSK (quadrature phase shift keying) and 16-QAM (quadrature amplitude modulation). The spatial multiplexing modulator 11 performs multiplexing processing on a known signal (a pilot signal or preamble signal) used for channel estimation (channel matrix determination) and on signals for a control channel for transmitting control information, as well as signals for data channels.

The transmission RF units 12 perform radio transmission processing, including DA (digital-to-analog) conversion, frequency conversion (up-conversion) into radio frequencies (RF), and so on, on L transmission data streams, and output L transmission RF signals.

Under the control of the antenna selection controller 15, the RF switch 13 selects L transmit antennas 14 used for transmission and couples the selected transmit antennas 14 with the transmission RF units 12.

The selected L transmit antennas 14 radiate the transmission RF signals, output from the transmission RF units 12 coupled via the RF switch 13, into space toward the mobile station 20.

In accordance with antenna indices transmitted from the mobile station 20, the antenna selection controller 15 controls the RF switch 13 to control the coupling between the transmission RF units 12 and the transmit antennas 14.

On the other hand, the receive antennas 21 of the mobile station 20 receive the corresponding RF signals transmitted from the transmit antennas 14 of the base station 10.

The reception RF units 22 perform radio reception processing on the RF signals received by the receive antennas 21. Examples of the radio reception processing include frequency conversion (down-conversion) into a baseband frequency and AD (analog-to-digital) conversion.

The MIMO reception signal processor 23 demultiplexes the reception signals (digital baseband signals) processed by the reception RF units 22, e.g., the spatially multiplexed reception signals, into transmission data streams. The MIMO reception signal processor 23 further demodulates and decodes the demultiplexed reception signals and outputs the resulting reception signals. In the first embodiment, the demultiplexing processing is performed through, for example, linear decoding, such as ZF (zero forcing) linear decoding or MMSE (minimum mean square error) decoding using an inverse matrix of a channel matrix. A scheme for demultiplexing the signals is not limited to this example and may be any other available scheme.

The channel matrix is a matrix representing a state of channels between the transmit antennas 14 and the receive antennas 21 and is determined, for example, by performing computation on correlations between a received pilot signal (or a preamble signal) and a known pilot signal (a pilot replica). A channel matrix H represents an $N_r \times N_t$ matrix representing a state of channels between the $N_t$ transmit antennas 14 and the $N_r$ receive antennas 21. A channel matrix $H_p$ denotes an $N_r \times L$ matrix representing a state of channels between the selected L transmit antennas 14, which correspond to a subset p of the transmit antennas 14, and the $N_r$ receive antennas 21. The subset p is one combination for selection of L transmit antennas 14 from the $N_t$ transmit antennas 14, and p∈P is satisfied (where P denotes a set of all possible subsets of the transmit antennas 14).

Reception signals $y_i$ (i=1, 2, . . . , $N_r$) corresponding to the receive antennas 21-1 to 21-$N_r$ are input from the reception RF units 22 to the MIMO reception signal processor 23. In this case, using the channel matrix, the relationship between the reception signal y and the transmission signal s is expressed by:

$$y = \sqrt{\frac{E_S}{L}} H_p s + w \qquad (1)$$

where y denotes an $N_r \times 1$ reception signal vector, s denotes an $L \times 1$ transmission signal (transmission data stream) vector, w denotes an $N_r \times 1$ noise vector, and Es denotes the total transmission power of the L transmit antennas 14 at each point in time.

As given by equation (2) below, the MIMO reception signal processor 23 uses a filter matrix G having an $L \times N_r$ size for the reception signal y to obtain an estimation value of the transmission signal s. The MIMO reception signal processor 23 then demodulates and decodes the demultiplexed signals and outputs the resulting reception data.

The estimation value ŝ of the transmission signal s is given by:

$$\hat{s} = Gy = \sqrt{\frac{E_s}{L}} GH_p s + Gw. \quad (2)$$

Using the channel matrix $H_p$, the filter matrix G is given as:

$$G = (H_p^H H_p + \delta \gamma I_L)^{-1} H_p^H \quad (3)$$

where $I_L$ denotes a matrix for an L×L identity matrix and $[\ ]^H$ denotes a conjugate transpose, ρ denotes an average SNR (signal-to-noise ratio) of all the receive antennas 21, and γ is L/ρ.

In this case, in the ZF linear decoding, a filter matrix G for δ=0 is used in equation (3). In the MMSE decoding, a filter matrix G for δ=1 is used in equation (3).

By using a value for an inverse matrix of the channel matrix and based on a given antennal selection criterion, the antenna selector 24 selects L transmit antennas 14 used for communication. The antenna selection criterion used in this case is a criterion of improving the communication performance, for example, a criterion corresponding to maximizing a minimum value of an SINR (signal to interference noise ratio), a criterion corresponding to maximizing the capacity of the system, or a criterion corresponding to minimizing an MSE (mean square error).

More specifically, for example, using the channel matrix $H_p$, the SINR for linear decoding of the jth data stream is given by:

$$SINR_p^j = \frac{1}{\gamma[(H_p^H H_p + \delta \gamma I_L)^{-1}]_{j,j}} - \delta \quad (4)$$

where $[A]_{j,j}$ represents an element in the jth row and the jth column in a matrix A.

The criterion of maximizing the minimum value of the SINR is given by:

$$H_p = \underset{p \in P}{\operatorname{argmax}} SINR_p^{min} \quad (5)$$

In equation (5), $SINR_p^{min}$ is given by:

$$SINR_p^{min} = \arg \min_{j=1,\ldots,L} SINR_p^j \quad (6)$$

For example, the system capacity (spectral efficiency) $C_p$ for the subset p of the selected transmit antennas 14 is given by:

$$C_p = \log_2 \left( \det \left( I_L + \frac{\rho}{L} H_p^H H_p \right) \right) \quad (7)$$

The criterion of maximizing the system capacity is given by:

$$H_p = \underset{p \in P}{\operatorname{argmax}} C_p = \underset{p \in P}{\operatorname{argmax}} \left\{ \log_2 \left( \det \left( I_L + \frac{\rho}{L} H_p^H H_p \right) \right) \right\} \quad (8)$$

For example, the MSE for the linear decoding is given by:

$$\Phi_p = E\{(\hat{s}-s)^H\} = N_0(H_p^H H_p + \delta \gamma I_L)^{-1} \quad (9)$$

where E{ } denotes an expectation computation and $N_0$ denotes a given coefficient.

The criterion of minimizing the MSE is given by:

$$H_p = \underset{p \in P}{\operatorname{argmin}} o(\Phi_p) \quad (10)$$

where o() denotes a diagonal sum or a determinant.

As given by equations (4) to (10) noted above, the subset p of the transmit antennas 14 which satisfies the antenna selection criterion may be obtained by calculating a value for the inverse matrix of the antenna matrix $H_p$.

More specifically, the antenna selection criterion used in the first embodiment may be an antenna selection criterion (a) that minimizes the diagonal sum of the inverse matrix, which corresponds to minimizing the MSE, or an antenna selection criterion (b) that minimizes the value of a last diagonal element in the inverse matrix, which corresponds to maximizing the value of the SINR. Other examples of the antenna selection criterion that may be used in the first embodiment include a criterion of minimizing the diagonal product in the inverse matrix, a criterion of maximizing the total sum of inverted values of values of diagonal elements in the inverse matrix, and a criterion of minimizing the maximum value of values of diagonal elements in the inverse matrix. Selecting the transmit antennas 14 used for communication so that the value for the inverse matrix satisfies the above-described antenna selection criterion makes it possible to achieve an increase in the system capacity, a reduction in the BER, and an improvement in the communication performance.

In this case, the antenna selector 24 performs communication using, out of the subsets p for selection of L transmit antennas 14 from the $N_t$ transmit antennas 14, L transmit antennas 14 with which the value for the inverse matrix determined by a first inverse-matrix determining unit 25 and a second inverse-matrix determining unit 26 satisfies the antenna selection criterion.

Using a channel matrix $H_1$ for a first antenna selected from the $N_t$ antennas, the first inverse-matrix determining unit 25 determines an inverse matrix $B_1$ of the channel matrix $H_1$. That is, the first inverse-matrix determining unit 25 determines the inverse matrix $B_1$ from the channel matrix $H_1$ by direct computation.

With respect to the (n+1)th transmit antenna 14 selected from the transmit antennas 14 other than the first to nth transmit antennas 14 already selected from the $N_t$ transmit antennas 14, the second inverse-matrix determining unit 26 determines an inverse matrix $B_{n+1}$ of a channel matrix $H_{n+1}$ for a group of the first to (n+1)th transmit antennas 14 by computation using an inverse matrix $B_n$ of a channel matrix $H_n$ for a group of the first to nth transmit antennas 14. That is, the second inverse-matrix determining unit 26 determines the inverse matrix $B_{n+1}$ from the inverse matrix $B_n$ by update computation.

The antenna selector 24 selects, as the first transmit antenna 14, the transmit antenna 14 with which a power value is maximized, and the first inverse-matrix determining unit 25 determines the inverse matrix $B_1$. The antenna selector 24 also selects, as candidates for the (n+1)th transmit antenna, the transmit antennas 14 one by one from the transmit antennas 14 other than the first to nth transmit antennas already selected from the $N_t$ transmit antennas 14. With respect to each of the selected candidates, the second inverse-matrix determining unit 26 in the antenna selector 24 determines the inverse matrix of the channel matrix for the group of the first to (n+1)th transmit antennas 14. The antenna selector 24 selects, as the (n+1)th transmit antenna 14, the candidate with which the value for the determined inverse matrix satisfies the above-described antenna selection criterion. The antenna selector 24 repeatedly performs such processing for selecting the transmit antennas 14 to thereby select the L transmit antennas 14 used for communication.

The uplink transmitting unit 31 in the mobile station 20 transmits antenna indices of the selected L transmit antennas 14 to the base station 10 through the feedback channel 30.

In the demultiplexing processing performed by the MIMO reception signal processor 23, the inverse matrix $H_p$ determined in the antenna selection processing by the antenna selector 24 may be used as the inverse matrix $H_p$ in equation (3) used in the MMSE decoding or ZF linear decoding. Alternatively, in the demultiplexing processing performed by the MIMO reception signal processor 23, the first and second inverse-matrix determining units 25 and 26 may be used to determine the inverse matrix $H_p$ in equation (3) in the MMSE decoding or ZF linear decoding.

An operation of the wireless communication system 1 according to the first embodiment, particularly, an operation related to the antenna selection processing, will be described below with reference to FIGS. 2 and 3.

Figure 2:
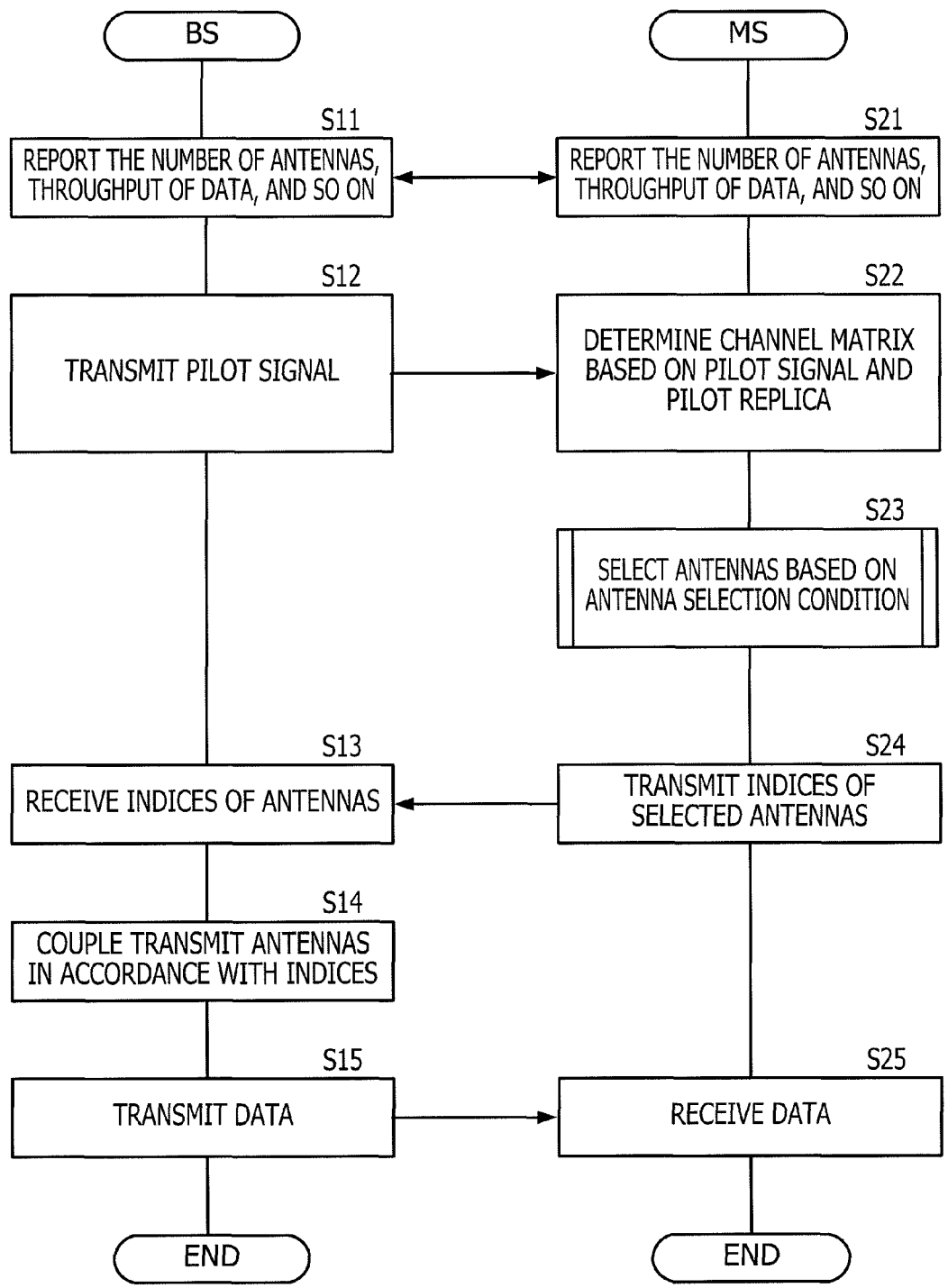
FIG. 2 is a flowchart illustrating the operation of the wireless communication system in FIG. 1.

Referring to FIG. 2, in steps S11 and S21, the base station 10 and the mobile station 20 transmit/receive information regarding the number of transmit/receive antennas, throughput of data streams, and so on therebetween, to thereby recognize the number of antennas and the throughput of the opposing end.

In step S12, the base station 10 transmits a pilot signal to the mobile station 20. In step S22, the MIMO reception signal processor 23 in the mobile station 20 estimates a channel matrix H by performing computation on a correlation between the received pilot signal and a pilot replica.

In step S23, the antenna selector 24 in the mobile station 20 selects a subset p of L transmit antennas 14 with which the value for the inverse matrix satisfies the given antenna selection criterion.

Figure 3:
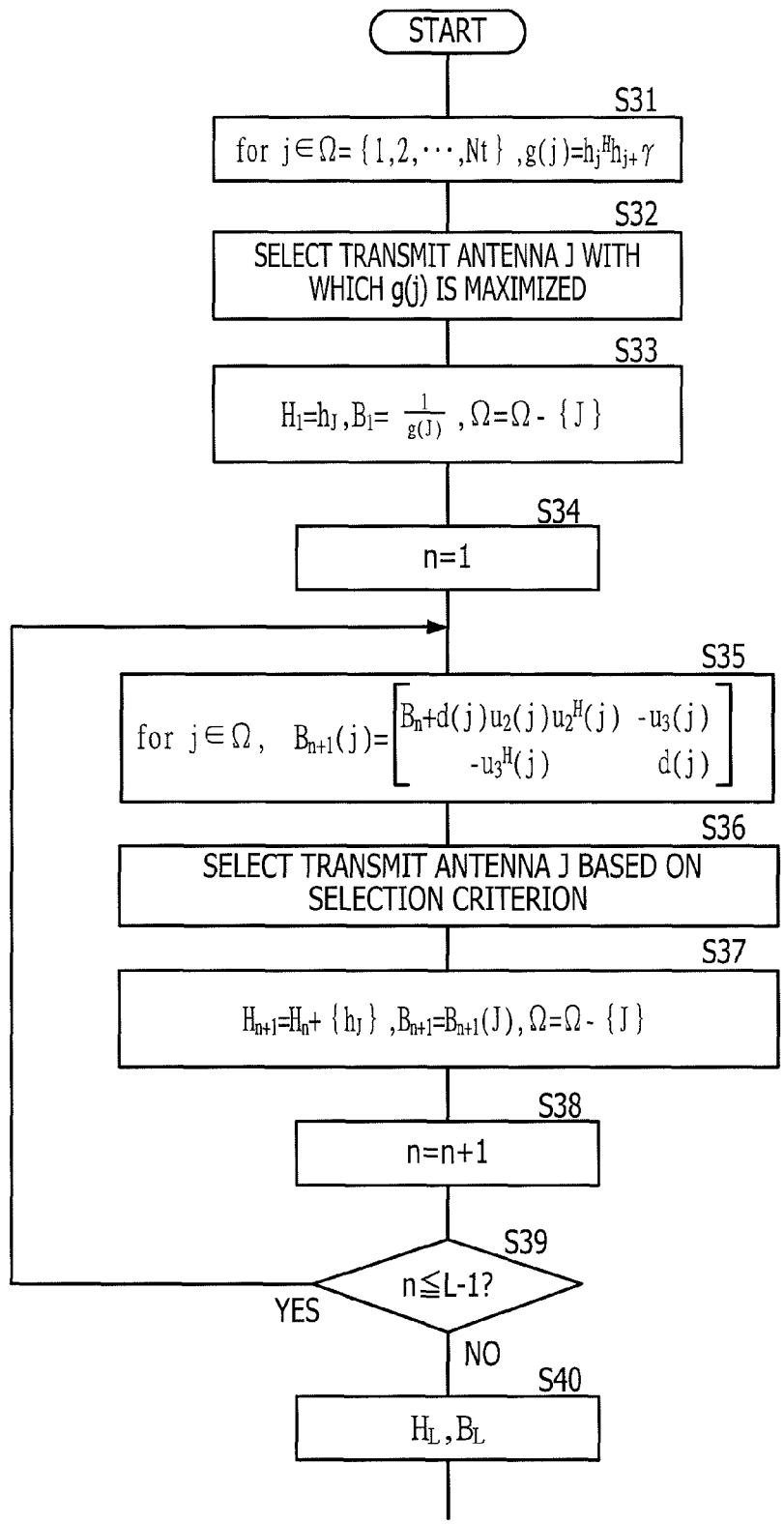
FIG. 3 is a flowchart illustrating antenna selection processing in FIG. 2.

More specifically, the antenna selector 24 determines the subset p of L transmit antennas 14, as illustrated in the flowchart in FIG. 3.

First, in step S31, with respect to each transmit antenna j of all transmit antennas $\Omega$ (where $j \in \Omega = \{1, 2, \ldots, N_t\}$), the antenna selector 24 determines a power value g(j) by using:

$$g(j) = h_j^H h_j + \gamma \qquad (11)$$

where $h_j$ denotes an $N_r \times 1$ vector representing the column j in the channel matrix H.

In step S32, the antenna selector 24 selects, as the first transmit antenna 14 of the subset p, the transmit antenna 14-J with which the power value g(j) is maximized. It may be presumed that the transmit antennas 14 with which the power value is maximized is included in the subset p of the transmit antennas 14 with which the communication performance is improved.

The first inverse-matrix determining unit 25 in the antenna selector 24 sets the channel matrix $H_1$ for the transmit antenna 14 selected first, the inverse matrix $B_1$ of the channel matrix $H_1$, and a set $\Omega$ of the remaining transmit antennas 14. That is, using the channel matrix $H_1$ ($=h_J$) for the first transmit antenna 14, the antenna selector 24 determines the inverse matrix $B_1$ ($=1/g(J)$) of the channel matrix $H_1$ by direct computation. In step S33, the antenna selector 24 sets the set $\Omega(=\Omega-\{J\})$ of the remaining transmit antennas 14.

In step S34, the antenna selector 24 sets "1" for the count value n of the number of selected antennas.

The antenna selector 24 then selects, as candidates for the (n+1)th transmit antenna 14, the transmit antennas j one by one from the set $\Omega$ of the remaining transmit antennas 14. In step S35, with respect to each of the selected candidates j, the second inverse-matrix determining unit 26 in the antenna selector 24 determines the inverse matrix $B_{n+1}$ of the channel matrix $H_{n+1}$ for the group of the first to (n+1)th antennas by using the inverse matrix $B_n$ of the channel matrix $H_n$ for the group of the first to nth transmit antennas 14.

More specifically, using relational equations for an inverse matrix, the inverse matrix $B_{n+1}$ is determined by equations (12) to (16) below.

$$\text{Let } u_1(j) = H_n^H h_j \qquad (12)$$

$$u_2(j) = B_n u_1(j) \qquad (13)$$

$$u_3(j) = d(j) u_2(j) \qquad (14)$$

$$d(j) = \frac{1}{g(j) - u_1(j)^H u_2(j)}. \qquad (15)$$

Then, $$\text{for } j \in \Omega, \; B_{n+1}(j) = \begin{bmatrix} B_n + d(j) u_2(j) u_2^H(j) & -u_3(j) \\ -u_3(j)^H & d(j) \end{bmatrix} \qquad (16)$$

where $h_j$ denotes an $N_r \times 1$ vector representing the column j in the channel matrix H. As a(j) is a real number, a(j) may be calculated by using real number part of the denominator of a(j) of expression (15).

In step S36, the second inverse-matrix determining unit 26 in the antenna selector 24 selects, as the (n+1)th transmit antenna, a candidate J with which the value for the inverse matrix $B_{n+1}$ determined in step S35 satisfies the antenna selection criterion (a) or (b) described below. More specifically, for use of the antenna selection criterion (a), the candidate J is selected so as to satisfy:

$$J = \underset{j \in \Omega}{\text{argmin}} \; \text{trace} \; (B_{n+1}(j)) \qquad (17)$$

Alternatively, for use of the antenna selection criterion (b), the candidate 3 is selected so as to satisfy:

$$J = \arg\min_{j \in \Omega} d(j) \quad (18)$$

The antenna selector 24 updates the channel matrix $H_{n+1}$ for the first to (n+1)th transmit antennas 14, the inverse matrix $B_{n+1}$ of the channel matrix $H_{n+1}$, and the set $\Omega$ of the remaining transmit antennas 14. That is, in step S37, the antenna selector 24 sets the channel matrix $H_{n+1} = H_n + \{h_J\}$, the inverse matrix $B_{n+1} = B_{n+1}(J)$, and the set $\Omega$ of the remaining transmit antennas 14 = $\Omega - \{J\}$.

In step S38, the antenna selector 24 sets "n+1" for the count value n of the number of selected antennas. In step S39, the antenna selector 24 determines whether or not the number n of selected antennas is smaller than or equal to L−1. When the result of the determination in step S39 is YES (n≦L−1), the process returns to step S35 and the antenna selector 24 repeats the processing in steps S35 to S38.

When the result of the determination in step S39 is NO, (n>L−1), the process proceeds to step S40. In step S40, the subset p for selection of the L transmit antennas 14 from the $N_t$ transmit antennas 14, the channel matrix $H_p$ for the subset p, and an inverse matrix $B_p$ thereof are obtained. Thereafter, the antenna selection processing ends.

Referring back to FIG. 2, in step S24, the uplink transmitting unit 31 in the mobile station 20 transmits the indices of the selected L transmit antennas 14 through the feedback channel 30.

In step S13, the uplink receiving unit 32 in the base station 10 receives the indices of the transmit antennas 14. In step S14, in accordance with the antenna indices, the antenna selection controller 15 in the base station 10 controls the RF switch 13 to couple the transmission RF units 12 and the transmit antennas 14. In step S15, the base station 10 transmits data via the coupled transmit antennas 14. In the mobile station 20, in step S25, the receive antennas 21 receive the transmitted data, the reception RF units 22 convert the received data, and the MIMO reception signal processor 23 processes the received data and outputs the resulting data.

The above-described antenna selection processing will be described in detail in conjunction with an example illustrated in FIG. 4. In the example in FIG. 4, the antenna selector 24 selects L=3 transmit antennas 14 from $N_t$=5 transmit antennas 14. First, in step S31, a power value g(j) for j∈Ω={1, 2, 3, 4, 5} is determined. In step S32, the transmit antenna 14-1 with which the power value g(j) is maximized is selected as the first transmit antenna 14. Next, in step S33, the channel matrix $H_1 = h_1$, the inverse matrix $B_1 = 1/g(1)$, and the set c of the remaining transmit antennas 14={2, 3, 4, 5} are set. In step S34, "1" is set for the count value n of the number of selected antennas.

In step S35, the channel matrix $H_1$ and the inverse matrix $B_1$ are used to determine inverse matrices $B_2(2)$, $B_2(3)$, $B_2(4)$, and $B_2(5)$ for the respective transmit-antenna groups {1, 2}, {1, 3}, {1, 4}, and {1, 5}. In step S36, the transmit antenna 14-3 with which the antenna selection criterion is satisfied is selected as the second transmit antenna 14. In step S37, the channel matrix $H_2 = H_1 + \{h_3\}$ for the first and second transmit antennas 14, the inverse matrix $B_2 = B_2(3)$, and the set $\Omega$ of the remaining antennas 14={2, 4, 5} are updated. In step S38, "2" is set for the count value n of the number of selected antennas.

Since the result of the determination in step S39 is YES (2 3−1), the process returns to step S35. Thus, the channel matrix $H_2$ and the inverse matrix $B_2$ are used to determine inverse matrices $B_3(2)$, $B_3(4)$, and $B_3(5)$ for the groups {1, 3, 2}, {1, 3, 4}, and {1, 3, 5} of the transmit antennas 14. In step S36, the transmit antenna 14-5 with which the antenna selection criterion is satisfied is selected as the third transmit antenna 14. In step S37, the channel matrix $H_3 = H_2 + \{h_5\}$ for the first to third transmit antennas 14, the inverse matrix $B_3 = B_3(5)$, and the set c of the remaining antennas 14={2, 4} are updated. In step S38, "3" is set for the count value n of the number of selected antennas.

Since the result of the determination in step S39 is NO (3>3−1), the process proceeds to step S40. Consequently, the subset p={1, 3, 5} for selection of three transmit antennas 14 from the five transmit antennas 14, the channel matrix $H_p$ for the subset p, and the inverse matrix $B_p$ are obtained. Thereafter, the antenna selection processing ends.

As described above, according to the antenna selection processing in the first embodiment, only for selection of the first transmit antenna 14, the inverse matrix is determined by the direct computation, and for selection of the second and subsequent transmit antennas 14, the inverse matrices are determined by the update computation that is simpler than the direct computation. Consequently, the processing time is reduced. In addition, as a result of sequential selection of the transmit antennas 14 with which the antenna selection criterion is satisfied, the computational complexity is reduced and the processing time is reduced. Further, as a result of transmission of data via the transmit antennas 14 selected as described above, the communication performance of the system improves in terms of the BER and the system capacity.

Figure 5:
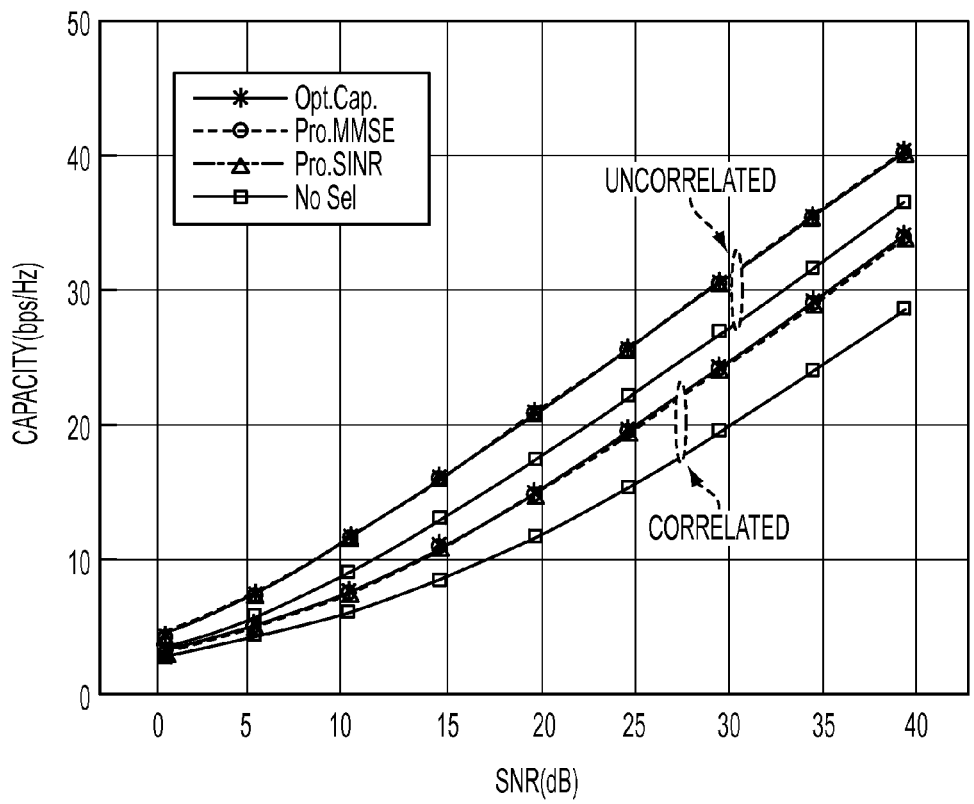
FIG. 5 is a graph depicting a capacity of the wireless communication system in FIG. 1.
Figure 6:
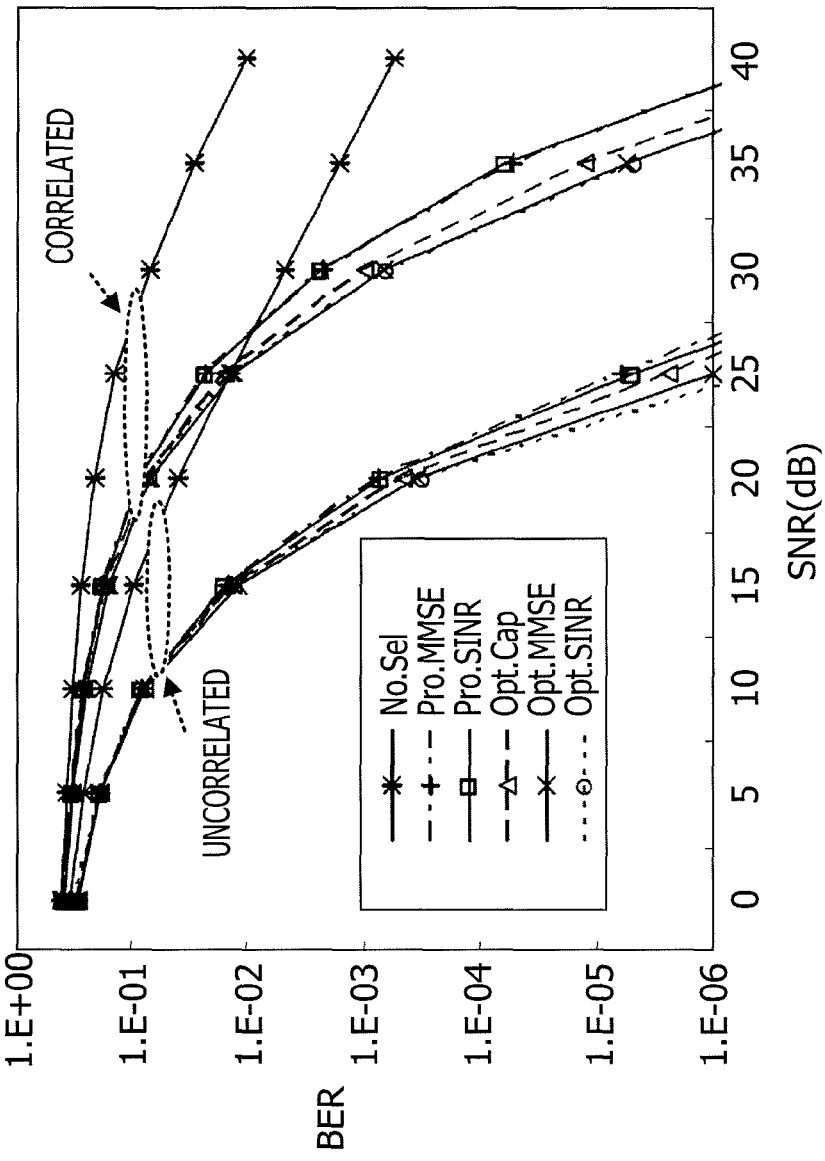
FIG. 6 is a graph depicting a BER of the wireless communication system in FIG. 1.

FIGS. 5 and 6 illustrate results of simulation of the communication performance of the above-described wireless communication system 1. In the simulation described below, calculation was performed under the condition in which the number $N_t$ of transmit antennas 14 was 9, the number $L_t$ of transmission data streams (the number of transmit antennas used) was L=3, and the number $N_r$ of receive antennas 21 was L=3.

FIG. 5 is a graph depicting the results of the simulation for the capacity of the wireless communication system 1. The horizontal axis indicates an SNR [dB] and the vertical axis indicates a capacity [bps/Hz]. In FIG. 5, data denoted by "○" represents data when three transmit antennas 14 selected based on the antenna selection criterion (a) based on MMSE were used in the first embodiment. In FIG. 5, data denoted by "Δ" represents data when three transmit antennas 14 selected based on the antenna selection criterion (b) based on SINR were used in the first embodiment. In FIG. 5, data denoted by "*" represents data in a comparative example in which three transmit antennas 14 with which the capacity was maximized were selected through an optimal-value search calculation. In FIG. 5, data denoted by "□" represents data in an example in which given three transmit antennas 14 were used without selection of the transmit antennas 14. In addition, in FIG. 5, the upper four pieces of data denoted by "uncorrelated" are data when the antennas are not correlated and the lower four pieces of data denoted by "correlated" are data when the antennas are correlated.

As illustrated in FIG. 5, the capacities when the antenna selection criteria (a) and (b) in the first embodiment were used and the capacity when the optimal-value search calculation was performed are at the same level and are increased compared to the case in which the transmit antennas 14 were not selected. This tendency is also true for both the cases in which the antennas are correlated and are not correlated. Thus, according to the first embodiment, it is possible to achieve an increase in the capacity and an improvement in the communication performance, as in the case when three transmit antennas 14 are optimally selected through the optimal-value search calculation.

FIG. 6 is a graph depicting results of simulation of the BER of the wireless communication system 1. The horizontal axis indicates an SNR [dB] and the vertical axis indicates a BER. In FIG. 6, data denoted by "+" represents data when three transmit antennas 14 selected based on the antenna selection criterion (a) based on MMSE were used in the first embodiment. In FIG. 6, data denoted by "□" represents data when three transmit antennas 14 selected based on the antenna selection criterion (b) based on SINR were used in the first embodiment. In FIG. 6, data denoted by "Δ" represents data in a comparative example in which three transmit antennas 14 with which the capacity was maximized were selected through an optimal-value search calculation and were used. In FIG. 6, data denoted by "x" represents data in a comparative example in which three transmit antennas 14 with which the MSE was minimized were selected through an optimal-value search calculation and were used. In FIG. 6, data denoted by "○" represents data in a comparative example in which three transmit antennas 14 with which the minimum value of the SINR was maximized were selected through an optimal-value search calculation and were used. In FIG. 6, data denoted by "*" represents data in an example in which given three transmit antennas 14 were used without selection of the transmit antennas 14. In addition, In FIG. 6, upper six pieces of data denoted by "correlated" represent data when the antennas are correlated and lower six pieces of data denoted by "uncorrelated" represent data when the antennas are not correlated.

As illustrated in FIG. 6, the BERs when the antenna selection criterion (a) and (b) in the first embodiment were used and the BER when the optimal-value search calculation was performed are slightly different from each other but are at substantially the same level, and are reduced compared to the case in which the transmit antennas 14 are not selected. This tendency is also true for both the cases in which the antennas are correlated and are not correlated. Thus, in the present embodiment, it is possible to achieve a reduction in the BER and an improvement in the communication performance, as in the case when the optimum three transmit antennas 14 are selected through the optimal-value search calculation.

Thus, according to the first embodiment, it is possible to select an appropriate combination of the transmit antennas 14 in a short processing time with respect to the wireless communication system 1 that is capable of performing MIMO communication.

Second Embodiment

A second embodiment will be described next with reference to FIG. 7. A wireless communication system according to a second embodiment is different in only the processing of the antenna selector 24 from the wireless communication system 1 according to the first embodiment. Descriptions of other configurations are omitted hereinafter.

In the second embodiment, the antenna selector 24 first determines all possible $M=N_t!/(L!(N_t-L)!)$ subsets P for selection of L transmit antennas 14 from the $N_t$ transmit antennas 14. Thereafter, with respect to each subset p∈P, the first and second inverse-matrix determining units 25 and 26 in the antenna selector 24 then determine an inverse matrix $B_p$. In this case, the antenna selector 24 determines the inverse matrices $B_p$ of the channel matrices $H_p$ for the second and subsequent subsets p, by using determination results of the inverse matrix $B_q$ of the channel matrix $H_q$ for the already determined subset q (q=1, 2, ..., p−1).

More specifically, the antenna selector 24 compares the subset p to be determined with the already determined subset q. When a group of the first to nth transmit antennas 14 is common with respect to the subset q in which the number of common antennas is the largest, the second inverse-matrix determining unit 26 determines an inverse matrix $B_{p,n+1}$ of a channel matrix $H_{p,n+1}$ for the group of the first to (n+1)th transmit antennas of the subset p to be determined, by using an inverse matrix $B_{q,n}$ of a channel matrix $H_{q,n}$ for the group of the first to nth antennas of the already determined subset. Based on the determined M inverse matrices $B_p$, the antenna selector 24 selects the subset p of the L transmit antennas 14 with which the value for the determined inverse matrix $B_p$ satisfies the antenna selection criterion.

The antenna selection criterion used in the second embodiment is, for example, a criterion of minimizing the diagonal sum in the matrix, a criterion of minimizing the diagonal product in the inverse matrix, a criterion of maximizing the total sum of inverted values of values of diagonal elements in the inverse matrix, or a criterion of minimizing the maximum value of values of diagonal elements in the inverse matrix. As a result of selection of the transmit antennas 14 used for communication such that the value for the inverse matrix satisfies the above-described antenna selection criterion, it is possible to achieve an increase in the system capacity, a reduction in the BER, and an improvement in the communication performance.

The above-described antenna selection processing will be described in detail in conjunction with an example illustrated in FIG. 7. In the example in FIG. 7, the antenna selector 24 selects L=3 transmit antennas 14 from $N_t$=5 transmit antennas 14. First, all possible M=10 subsets P for selection of three transmit antennas 14 from five transmit antennas 14 are determined. With respect to the subsets 1 to 10, the first and second inverse-matrix determining units 25 and 26 determine inverse matrices $B_1$ to $B_{10}$. As described above, only with respect to the first transmit antenna 14, the inverse matrix is determined by the direct computation, and with respect to the groups of the second and subsequent transmit antennas 14, the inverse matrices are determined by the update computation that is simpler than the direct computation. Consequently, the processing time is reduced.

In this case, it is assumed in FIG. 7 that the subsets 1 to 10 are sequentially determined. In FIG. 7, with respect to the inverse matrices for the groups of the transmit antennas 14 surrounded by dashed lines, inverse matrices determined for other subsets are directly used. For example, the inverse matrices for the second subset {1, 2, 4} and the third subset {1, 2, 5} are determined using the inverse matrix determined for {1, 2} in the first subset. The inverse matrices for the fourth subset {1, 3, 4} and the sixth subset {1, 4, 5} are determined by the inverse matrix determined for {1} in the first subset. The inverse matrix for the fifth subset {1, 3, 5} is determined by the inverse matrix determined for {1, 3} in the fourth subset. The inverse matrix for the eighth subset {2, 3, 5} is determined using the inverse matrix determined for {2, 3} in the seventh subset. The inverse matrix for the ninth subset {2, 4, 5} is determined by the inverse matrix determined for {2} in the seventh subset. With this arrangement, it is possible to reduce the processing time through omission of some of the computation.

Thus, according to the second embodiment, it is possible to select an appropriate combination of the transmit antennas 14 in a short processing time with respect to the wireless communication system 1 that is capable of performing MIMO communication.

Third Embodiment

A third embodiment will be described next with reference to FIG. 8. A wireless communication system according to a third embodiment is different in only the processing of the antenna selector 24 from the wireless communication system 1 according to the first embodiment. Descriptions of other configurations are omitted hereinafter.

In the third embodiment, the antenna selector 24 selects, as candidates for the (n+1)th transmit antenna, the transmit antennas 14 one by one from the transmit antennas 14 other than the first to nth transmit antennas already selected from the $N_t$ transmit antennas 14. With respect to each of the selected candidates, the second inverse-matrix determining unit 26 in the antenna selector 24 calculates a value (e.g., f(j), described below) for an inverse matrix of a channel matrix for a group of the first to (n+1)th antennas 14. The antenna selector 24 selects, as the (n+1)th transmit antenna, the candidate with which the value for the determined inverse matrix satisfies the above-described antenna selection criterion. The antenna selector 24 repeatedly performs such processing for selecting the transmit antennas 14 to thereby select the L transmit antennas 14 used for communication.

Figure 8:
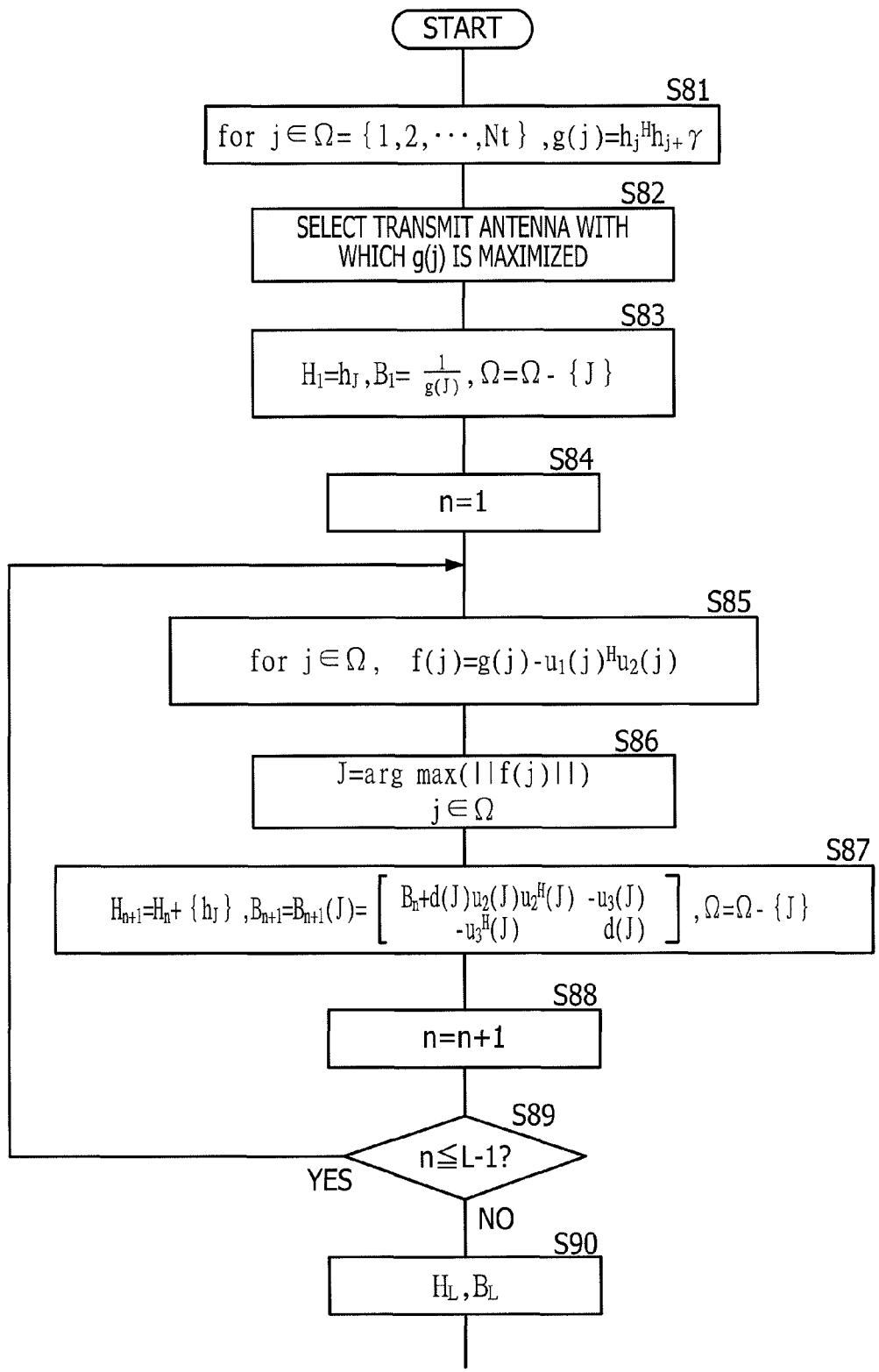
FIG. 8 is a flowchart illustrating antenna selection processing of the wireless communication system according to a third embodiment.

More specifically, the antenna selector 24 determines the subset p of L transmit antennas 14, as illustrated in the flowchart in FIG. 8. Since processing in steps S81 to S84 and S88 to S90 in FIG. 8 is analogous to the processing in steps S31 to S34 and S38 to S40 illustrated in FIG. 3 according to the first embodiment, a description thereof is not given hereinafter.

In step S85 in FIG. 8, the antenna selector 24 selects, as candidates for the (n+1)th transmit antenna 14, the transmit antennas j one by one from the set Ω of the remaining transmit antennas 14. Further, in step S85, with respect to each of the selected candidates j, the second inverse-matrix determining unit 26 in the antenna selector 24 determines a value f(j) for the inverse matrix $B_{n+1}$ of the channel matrix $H_{n+1}$ for the group of the first to (n+1)th antennas by using the inverse matrix $B_n$ of the channel matrix $H_n$ for the group of the first to nth transmit antennas 14. More specifically, using relational equations for an inverse matrix, the value f(j) is determined by equations (19) to (21).

$$\text{Let } u_1(j) = H_n^H h_j \quad (19)$$

$$u_2(j) = B_n u_1(j) \quad (20).$$

Then, $$f(j) = g(j) - u_1(j)^H u_2(j) \quad (21)$$

where $h_j$ denotes an $N_r \times 1$ vector representing the column j in the channel matrix H.

Next, in step S86, the second inverse-matrix determining unit 26 in the antenna selector 24 selects, as the (n+1)th transmit antenna, a candidate J with which the value f(j) for the inverse matrix, the f(j) being determined in step S85, satisfies:

$$J = \underset{j \in \Omega}{\operatorname{argmax}}(f(j)) \quad (22)$$

As given by equations (15) and (16) noted above, the value f(j) corresponds to an inverse of the value of a last diagonal element of the inverse matrix $B_{n+1}$. Thus, selection of the candidate J that satisfies equation (22) is equivalent to selection of the candidate J that satisfies the antenna selection criterion (b) of minimizing the value of the last diagonal element in the inverse matrix, the criterion (b) corresponding to maximizing the value of the SINR of added transmit antenna.

Next, the antenna selector 24 updates the channel matrix $H_{n+1}$ for the first to (n+1)th transmit antennas 14, the inverse matrix $B_{n+1}$ of the channel matrix $H_{p+1}$, and the set Ω of the remaining transmit antennas 14. That is, in step S87, the antenna selector 24 sets the channel matrix $H_{n-1} = H_n + \{h_j\}$, the inverse matrix $B_{n+1} = B_{n+1}(J)$, and the set Ω of the remaining transmit antennas 14=Ω−{J}. In the third embodiment, the value f(j) for the inverse matrix, not the inverse matrix $B_{n+1}$ itself, is determined in step S85, the candidate 3 is selected in step S86, and then the inverse matrix $B_{n+1}$ is determined. With this arrangement, it is possible to reduce the processing time through omission of some of the computation.

In addition, the processing in steps S88 to S90 is executed as in the first embodiment, so that the subset p for selection of L transmit antennas 14 from the $N_t$ transmit antennas 14, the channel matrix $H_p$ for the subset p, and the inverse matrix $B_p$ are obtained. Thereafter, the antenna selection processing ends.

Thus, according to the third embodiment, it is possible to select an appropriate combination of the transmit antennas 14 in a short processing time with respect to the wireless communication system 1 that is capable of performing MIMO communication.

Fourth Embodiment

A fourth embodiment will be described next with reference to FIGS. 9 and 10. A wireless communication system according to a fourth embodiment is different in only the processing of the antenna selector 24 from the wireless communication system 1 according to the first embodiment. Descriptions of other configurations are omitted hereinafter.

Figure 9:
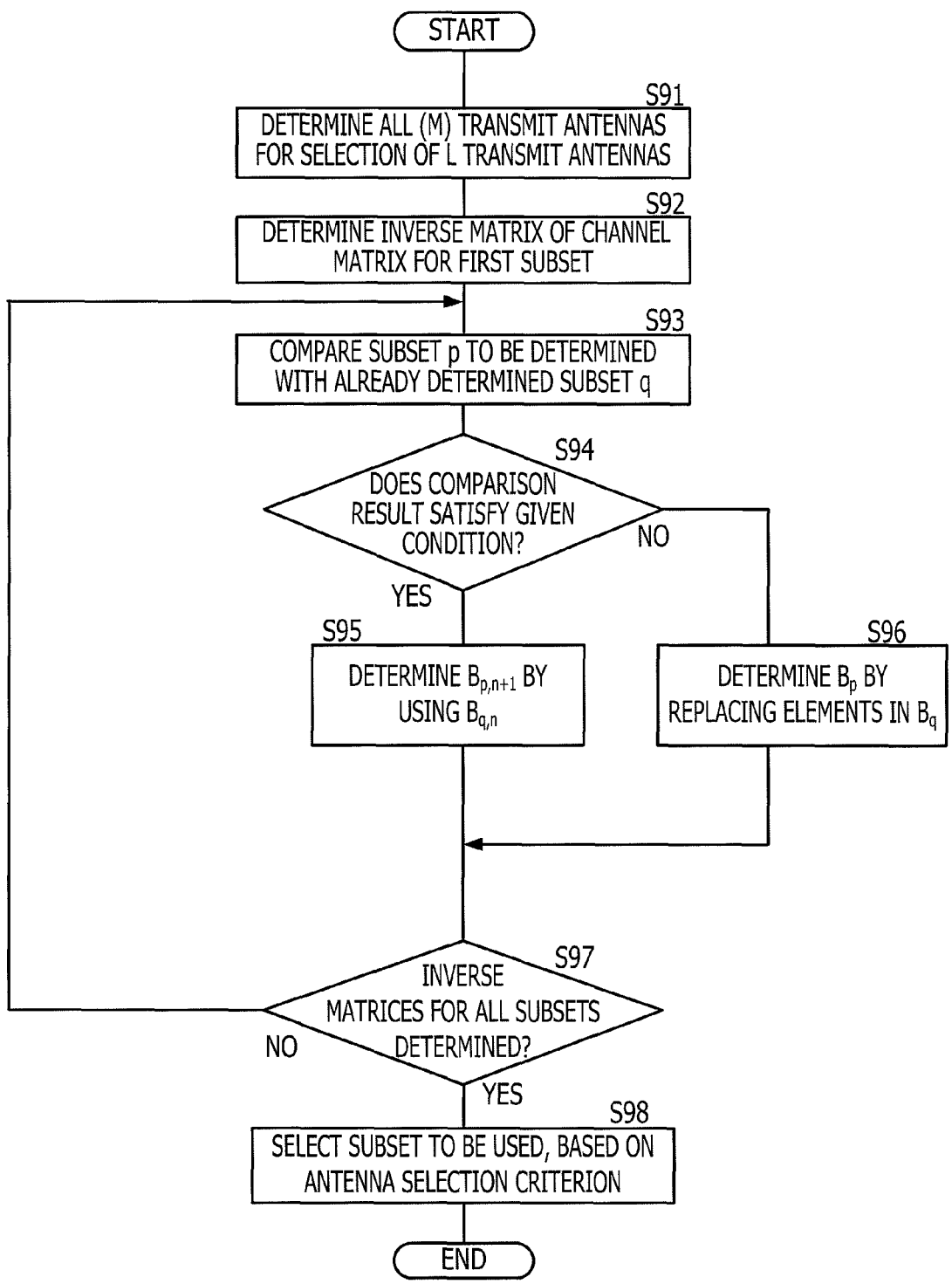
FIG. 9 is a flowchart illustrating antenna selection processing of the wireless communication system according to fourth and fifth embodiments.

FIG. 9 is a flowchart illustrating antenna selection processing in the fourth embodiment. In the fourth embodiment, in step S91, the antenna selector 24 first determines all possible $M = N_t!/(U(N_t-L)!)$ subsets P for selection of L transmit antennas 14 from the $N_t$ transmit antennas 14, as in the second embodiment. The first and second inverse-matrix determining units 25 and 26 in the antenna selector 24 determine an inverse matrix $B_p$ for each subset p∈P. In this case, in step S92, the antenna selector 24 determines the inverse matrix $B_p$ of the channel matrix $H_p$ for the first subset, as in the second embodiment. As described above, only with respect to the first transmit antenna 14, the inverse matrix is determined by the direct computation, and with respect to the groups of the second and subsequent transmit antennas 14, the inverse matrices are determined by the update computation that is simpler than the direct computation. Consequently, the processing time is reduced. The antenna selector 24 also determines the inverse matrices $B_p$ of the channel matrices $H_p$ for the second and subsequent subsets p, by using determination results of the inverse matrix $B_q$ of the channel matrix $H_q$ for the already determined subset q (q=1, 2, . . . , p−1).

More specifically, in step S93, the antenna selector 24 compares the subset p to be determined with the already determined subset q. In step S94, the antenna selector 24 determines whether or not the comparison result satisfies a given condition, for example, whether or not n is greater than or equal to a given value for a case in which a group of the first to nth transmit antennas is common with respect to the subset q in which the number of common antennas is the largest. When the comparison result satisfies the given condition, the process proceeds to step S95. In step S95, the second inverse-matrix determining unit 26 determines an inverse matrix $B_{p,n+1}$ of a channel matrix $H_{p,n+1}$ for the group of the first to (n+1)th transmit antennas of the subset p to be determined, by using an inverse matrix $B_{q,n}$ of a channel matrix $h_p$ for a group of the first to nth transmit antennas of the already determined subset, as in the second embodiment.

When the comparison result in step S94 does not satisfy the given condition, for example, when n is smaller than the given value for a case in which a group of the first to nth transmit antennas is common with respect to the subset q in which the number of common antennas is the largest, the process proceeds to step S96. In step S96, the second inverse-matrix determining unit 26 determines an inverse matrix $B_p$ for the subset p to be determined, by executing replacement processing, which replaces an element corresponding to a different transmit antenna, on the inverse matrix $B_q$ of the channel matrix $H_q$ for the subset q in which the number of different transmit antennas is smallest.

In this replacement processing, when the jth transmit antenna in the subset p and the jth transmit antenna in the subset q are different from each other, an element corresponding to the jth transmit antenna in the subset q is first removed from the inverse matrix $B_q$. Subsequently, an element corresponding to the jth transmit antenna in the subset p is added to thereby determine the inverse matrix $B_p$.

In order to remove the element corresponding to the jth transmit antenna from the inverse matrix $B_{n+1}$ of the channel matrix $H_{n+1}$ for the group of the first to (n+1)th transmit antennas, the second inverse-matrix determining unit 26 first determines a matrix $B_{n+1}'$ in which the element at the jth row and the jth column in the inverse matrix $_{Bn+1}$ are replaced with the element at the last row and last column in the inverse matrix $B_{n+1}$.

$$B_{n+1}' = \begin{bmatrix} C_1 & -c_2 \\ -c_2^H & c_3 \end{bmatrix} \quad (23)$$

where $C_1$ denotes an n×n matrix, $c_2$ denotes an n×1 vector, and $c_3$ denotes a 1×1 scalar.

Similarly to equations (12) to (16) noted above, using the matrix $B_{n+1}'$ in equation (23), an inverse matrix $B_n'$ obtained by removing the element corresponding to the jth transmit antenna is determined from a relational equation for an inverse matrix, as given by:

$$B_n' = C_1 - \frac{c_2^H c_2}{c_3} \quad (24)$$

Similarly to equations (12) to (16) noted above, the inverse matrix $_{B\ n+1}$ obtained by adding an element corresponding to the jth transmit antenna to the inverse matrix $B_n$ of the channel matrix $H_n$ for the group of the first to nth antennas is determined from a relational equation for an inverse matrix, as given by equation (25).

$$\text{Let } B_n = (H_n^H H_n + \gamma I_n), \quad (25)$$

-continued $$u_1 = H_n^H h_j,$$

$$u_2 = B_n u_1,$$

$$u_3 = d u_2,$$

$$g = h_j^H h_j + \gamma,$$

$$\text{and } d = \frac{1}{g - u_1^H u_2}.$$

Then, $$B_{n+1} = \begin{bmatrix} B_n + d u_2 u_2^H & -u_3 \\ -u_3^H & d \end{bmatrix}$$

where $h_j$ denotes an $N_t \times 1$ vector representing the column j in the channel matrix H.

Consequently, in step S97, the antenna selector 24 determines M inverse matrices $B_p$. In step S98, based on the determined M inverse matrices $B_p$, the antenna selector 24 selects a subset p of L transmit antennas 14 with which the value for the determined inverse matrix $B_p$ satisfies the antenna selection criterion, as in the second embodiment, The above-described antenna selection processing will be described in detail in conjunction with an example illustrated in FIG. 10. In the example in FIG. 10, the antenna selector 24 selects L=7 transmit antennas 14 from $N_t$=8 transmit antennas 14. First, all possible M=8 subsets P for selection of seven transmit antennas 14 from eight transmit antennas 14 are determined. With respect to the subsets 1 to 8, the first and second inverse-matrix determining units 25 and 26 determine inverse matrices $B_1$ to $B_8$. As described above, only with respect to the first transmit antenna 14, the inverse matrix is determined by the direct computation, and with respect to the groups of the second and subsequent transmit antennas 14, the inverse matrices are determined by the update computation that is simpler than the direct computation. Consequently, the processing time is reduced.

In this case, it is assumed in FIG. 10 that the subsets 1 to 8 are sequentially determined. With respect to the inverse matrices for the groups of the transmit antennas 14 surrounded by broken lines, inverse matrices determined for the other subsets are directly used. For example, the inverse matrix for the second subset is determined using the inverse matrix determined for a group {1, 2, 3, 4, 5, 6} in the first subset. The inverse matrix for the third subset is determined using the inverse matrix determined for a group {1, 2, 3, 4, 5} in the first subset. With this arrangement, it is possible to reduce the processing time through omission of some of the computation.

In addition, the inverse matrices for the fourth and subsequent subsets are determined by performing replacement processing, which replaces elements corresponding to different transmit antennas 14 (i.e., transmit antennas 14 surrounded by solid lines in FIG. 10), on the inverse matrices for the determined subsets. For example, the inverse matrix for the fourth subset is determined by performing processing for removing the transmit antenna {5} from the inverse matrix of the third subset and adding the transmit antenna {6} thereto. With this arrangement, it is possible to reduce the processing time through omission of some of the computation.

Thus, according to the fourth embodiment, it is possible to select an appropriate combination of the transmit antennas 14 in a short processing time with respect to the wireless communication system 1 that is capable of performing MIMO communication.

Fifth Embodiment

A fifth embodiment will be described next. A wireless communication system according to a fifth embodiment is different in only the processing of the antenna selector 24 from the wireless communication system 1 according to the first embodiment. Descriptions of other configurations are omitted hereinafter. The processing of the antenna selector 24 in the fifth embodiment and the processing of the antenna selector 24 in the fourth embodiment are different from each other in only a detail of the replacement processing for replacing the elements corresponding to the different transmit antennas, STEP 96 in FIG. 9. So, the fifth embodiment will be described with reference to FIG. 9.

In the fifth embodiment, the antenna selector 24 first determines all possible $M=N_t!/(L!(N_t-L)!)$ subsets P for selection of L transmit antennas 14 from the $N_t$ transmit antennas 14, as in the fourth embodiment. Then, with respect to each subset $p \in P$, the first and second inverse-matrix determining units 25 and 26 in the antenna selector 24 determine an inverse matrix $B_p$. The antenna selector 24 determines the inverse matrices $B_p$ of the channel matrices $H_p$ for the second and subsequent subsets p, by using determination results of the inverse matrix $B_q$ of the channel matrix $H_q$ for the already determined subset q (q=1, 2, . . . , p−1).

The antenna selector 24 compares the subset p to be determined with the already determined subset q. For example, when the comparison result indicates that n is smaller than a given value for a case in which a group of the first to nth transmit antennas is common with respect to the subset q in which the number of common antennas is the largest, the second inverse-matrix determining unit 26 determines an inverse matrix $B_p$ for the subset p to be determined, by executing replacement processing, which replaces an element corresponding to a different transmit antennas, on the inverse matrix $B_q$ of the channel matrix $H_q$ for the subset q in which the number of different transmit antennas is smallest. With this arrangement, it is possible to reduce the processing time through omission of some of the computation.

In the replacement processing in the fifth embodiment, when the jth transmit antenna in the subset p and the jth transmit antenna in the subset q are different from each other, an element corresponding to the jth transmit antenna in the inverse matrix $B_q$ is itself changed to determine the inverse matrix $B_p$. That is, the column j in the inverse matrix $B_q$ is changed to determine the inverse matrix $B_p$.

A matrix P in which the column j in a matrix Q is replaced with a column vector h is determined by determining a matrix D as given by equation (26) and performing, using the matrix D, calculation given by equation (27) based on mathematical relational equations for a matrix.

Let $c=h-Q^*_j$, $f=Q^H c$, $Q^*_j$ be a vector for the column J, $D^{-1}_j{}^*$ be a vector for the row J of $D^{-1}$, and be a unit vector.
Then, $$D^{-1} = (Q^H Q)^{-1} - \frac{(Q^H Q)^{-1}_{*j}(f^H (Q^H Q)^{-1})}{1 + f^H (Q^H Q)^{-1}_{*j}} \quad (26)$$

$$(P^H P)^{-1} = D^{-1} - \frac{D^{-1}(f + e_j c^H c)D^{-1}_{j*}}{1 + D^{-1}_{j*}(f + e_j c^H c)}. \quad (27)$$

Thus, according to the fifth embodiment, it is possible to select an appropriate combination of the transmit antennas 14 in a short processing time with respect to the wireless communication system 1 that is capable of performing MIMO communication.

Sixth Embodiment

Figure 11:
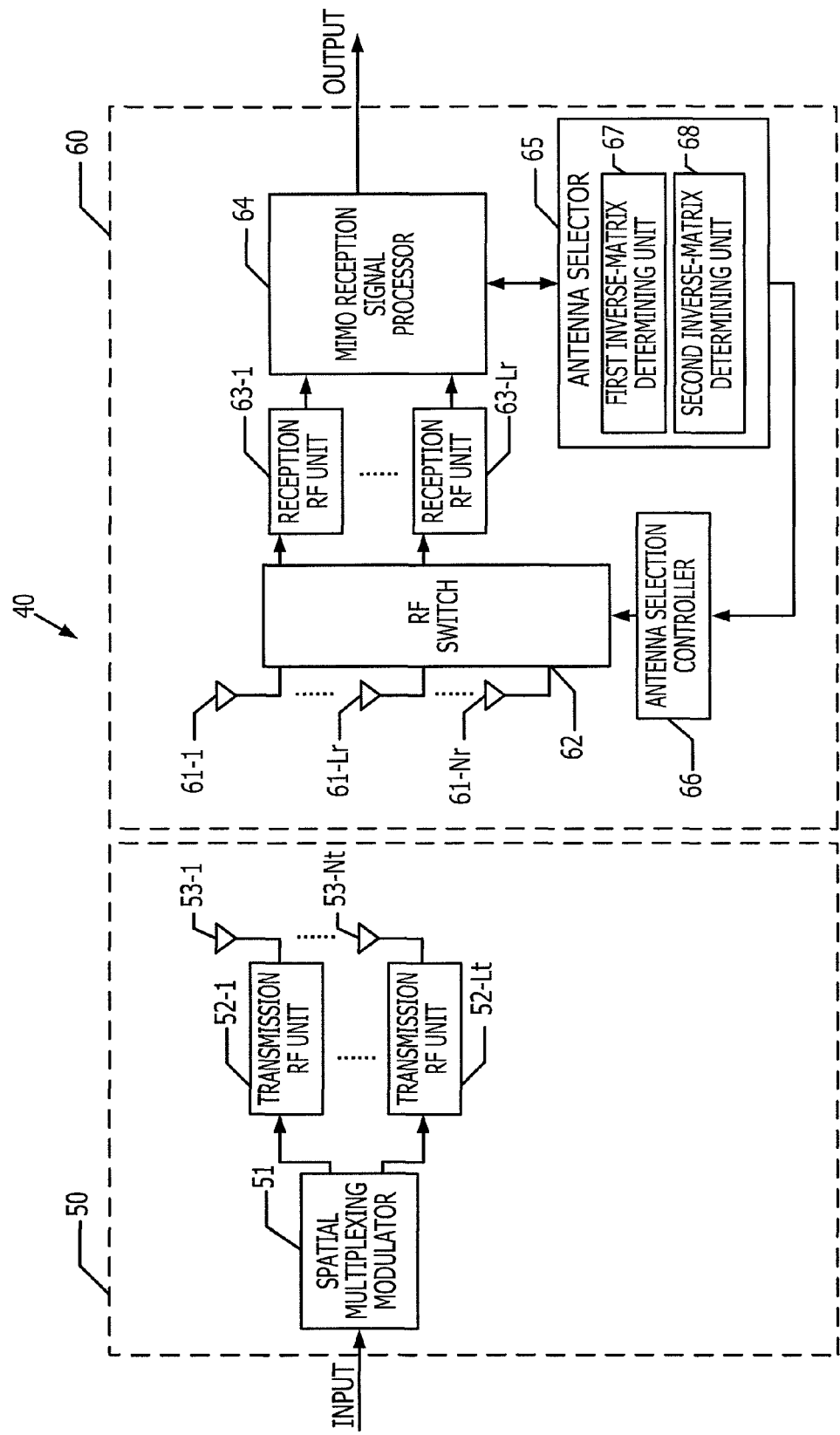
FIG. 11 is a block diagram of a wireless communication system according to a sixth embodiment.

A sixth embodiment will be described next with reference to FIGS. 11 and 12. FIG. 11 is a block diagram illustrating a wireless communication system 40 according to a sixth embodiment. The wireless communication system 40 is a one example of the wireless communication system according to the present disclosure. The wireless communication system 40 illustrated in FIG. 11 is capable of performing MIMO communication, and includes at least one base station 50 and at least one mobile station 60. The base station 50 serves as a wireless communication apparatus (a transmitter) at a transmitting end and the mobile station 60 serves as a wireless communication apparatus (a receiver) at a receiving end.

The base station 50 includes a spatial multiplexing modulator 51, $L_t$ transmission RF (radio frequency) units 52-1 to 52-$L_t$ ($L_t$ is an integer of 2 or greater), $N_t$ transmit antennas 53-1 to 53-$N_t$ ($N_t$ is an integer of 2 or greater, and is equal to $L_t$). The $L_t$ transmission RF units 52-1 to 52-4 may hereinafter be referred to as "transmission RF units 52", unless they are to be distinguished from each other and the transmit antennas 53-1 to 53-$N_t$ may hereinafter be referred to as "transmit antennas 53", unless they are to be distinguished from each other. The provision of the $L_t$ transmission RF units 52 indicates that the number of transmission data streams that may be processed by the base station 50 at one time is $L_t$.

The mobile station 60 includes $N_r$ receive antennas 61-1 to 61-$N_r$ ($N_r$ is an integer of 2 or greater), an RF switch 62, $L_r$ reception RF units 63-1 to 63-$L_r$ ($L_r$ is an integer of 2 or greater, and is smaller than $N_r$), a MIMO reception signal processor 64, an antenna selector 65, and an antenna selection controller 66. The receive antennas 61-1 to 61-$N_r$ may hereinafter be referred to as "receive antennas 61", unless they are to be distinguished from each other and the reception RF units 63-1 to 63-$L_r$ may hereinafter be referred to as "reception RF units 63", unless they are to be distinguished from each other. The provision of the $L_r$ reception RF units 63 indicates that the number of reception data streams that may be processed by the mobile station 60 at one time is $L_r$. The mobile station 60 selects $L_r$ antennas from the $N_r$ antennas and performs reception using the $L_r$ antennas. It is also assumed hereinafter that the number $L_r$ of reception data streams and the number $L_t$ of transmission data streams are the same L. In the sixth embodiment, it is assumed that the number $N_r$ of transmit antennas 53 is the same as $L_r$ and all transmit antennas 53 are used to perform transmission.

Details of the spatial multiplexing modulator 51, the transmission RF units 52, and the transmit antennas 53 in the base station 50 are similar to those of the spatial multiplexing modulator 11, the transmission RF units 12, and the transmit antennas 14 in the base station 10 in the first embodiment.

Similarly, details of the receive antennas 61, the reception RF units 63, and the MIMO reception signal processor 64 in the mobile station 60 are similar to those of the receive antennas 21, the reception RF units 22, and the MIMO reception signal processor 23 in the mobile station 20 in the first embodiment.

Under the control of the antenna selection controller 66, the RF switch 62 in the mobile station 60 selects L receive antennas 61 used for reception and couples the selected receive antennas 61 with the reception RF units 63.

In accordance with antenna indices transmitted from the antenna selector 65, the antenna selection controller 66 controls the RF switch 62 to control coupling between the reception RF units 63 and the receive antennas 61.

By using the value for the inverse matrix of the channel matrix and based on a given antennal selection criterion, the antenna selector 65 selects L receive antennas 61 used for communication. The antenna selection criterion may be a criterion of improving the communication performance, for example, a criterion corresponding to maximizing the minimum value of an SINR, a criterion corresponding to maximizing the system capacity, or a criterion corresponding to minimizing an MSE.

In this case, the antenna selector 65 performs communication using, out of the subsets p for selection of L receive antennas 61 from the $N_r$ receive antennas 61, L receive antennas 61 with which the value for the inverse matrix determined by a first inverse-matrix determining unit 67 and a second inverse-matrix determining unit 68 satisfies the antenna selection criterion. More specifically, as in the second embodiment, the antenna selection criterion used in this case is, for example, a criterion of minimizing the diagonal sum in the matrix, a criterion of minimizing the diagonal product in the inverse matrix, a criterion of maximizing the total sum of inverted values of values of diagonal elements in the inverse matrix, or a criterion of minimizing the maximum value of values of diagonal elements in the inverse matrix. As a result of selection of the receive antennas 61 used for communication such that the value for the inverse matrix satisfies the above-described antenna selection criterion, it is possible to achieve an increase in the system capacity, a reduction in the BER, and an improvement in the communication performance.

Figure 12:
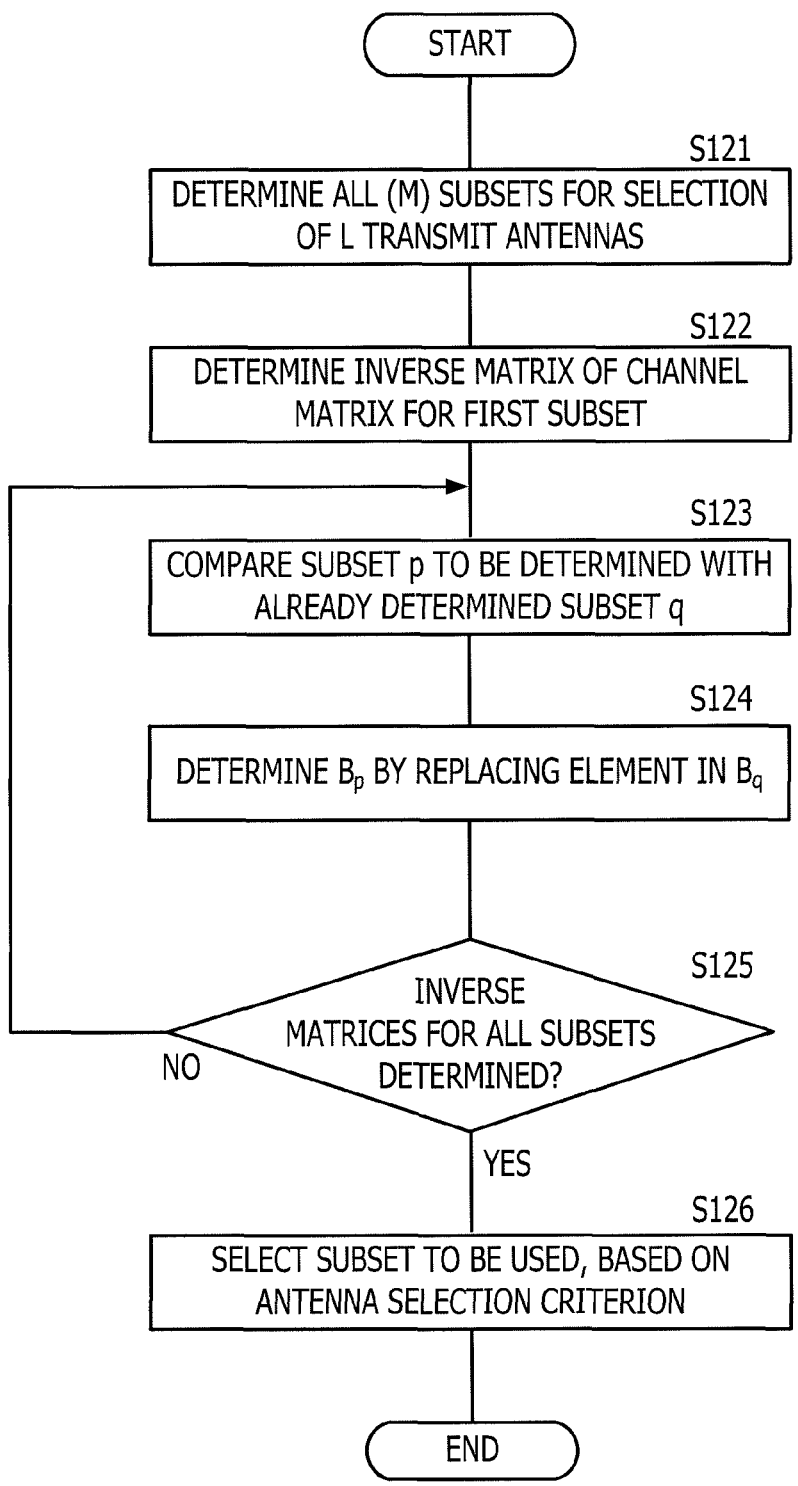
FIG. 12 is a flowchart illustrating antenna selection processing in FIG. 11.

FIG. 12 is a flowchart illustrating antenna selection processing in the sixth embodiment. In the sixth embodiment, first, in step S121, the antenna selector 65 determines all possible $M=N_r!/(L!(N_r-L)!)$ subsets P for selection of L receive antennas 61 from the $N_r$ receive antennas 61, as in the second embodiment. With respect to each subset p∈P, the first and second inverse-matrix determining units 67 and 68 in the antenna selector 65 determine an inverse matrix $B_p$. In this case, in step S122, the antenna selector 65 determines the inverse matrix $B_p$ of the channel matrix $H_p$ for the first subset, as in the second embodiment. As described above, only with respect to the first receive antenna 61, the inverse matrix is determined by the direct computation, and with respect to the groups of the second and subsequent receive antennas 61, the inverse matrices are determined by the update computation that is simpler than the direct computation. Consequently, the processing time is reduced.

The antenna selector 65 also determines the inverse matrices $B_p$ of the channel matrices $H_p$ for the second and subsequent subsets p, by using a determination result of the inverse matrix $B_q$ of the channel matrix $H_q$ for the already determined subset q (q=1, 2, ..., p−1).

More specifically, in step S123, the antenna selector 65 compares the subset p to be determined with the already determined subset q. In step S124, with respect to the inverse matrix $B_q$ of the channel matrix $H_q$ for the subset q in which the number of different receive antennas is the smallest, the second inverse-matrix determining unit 68 determines the inverse matrix $B_p$ for the subset p to be determined, by executing replacement processing for replacing an element corresponding to the different receive antenna. With this arrangement, it is possible to reduce the processing time through omission of some of the computation.

In the replacement processing, when the jth receive antennas in the subset p and the subset q are different from each other, an element corresponding to the jth receive antenna in the inverse matrix $B_q$ is itself changed to determine the inverse matrix $B_p$. That is, the column j in the inverse matrix $B_q$ is changed to determine the inverse matrix $B_p$.

A matrix P in which the row j in a matrix Q is replaced with a row vector h is determined by determining a matrix D as given by equation (28) and performing, using the matrix D, calculation given by equation (29) based on mathematical relational equations for a matrix.

Let $c=h^H-Q^H_j*$, and $Q_j*$ be a vector for the column J in Q. Then, $$D^{-1} = (Q^H Q)^{-1} - \frac{((Q^H Q)^{-1} c^*)(Q_{j*}(Q^H Q)^{-1})}{Q_{j*}(Q^H Q)^{-1} h^H} \quad (28)$$

$$(P^H P)^{-1} = D^{-1} - \frac{(D^{-1} h^H)(c^T D^{-1})}{1 + c^T D^{-1} h^H}. \quad (29)$$

Thus, in step S125, the antenna selector 65 determines M inverse matrices $B_p$. In step S126, based on the determined M inverse matrices $B_p$, the antenna selector 65 selects a subset p of L receive antennas 61 with which the value for the determined inverse matrix $B_p$ satisfies the antenna selection criterion, as in the second embodiment.

Thus, according to the sixth embodiment, it is possible to select an appropriate combination of the receive antennas 61 in a short processing time with respect to the wireless communication system 40 that is capable of performing MIMO communication.

According to another embodiment, when the number M of all combinations for selection of L transmit antennas 14 from the $N_t$ transmit antennas 14 is greater than or equal to a reference number, the L transmit antennas 14 may be selected as in the first embodiment, and when the number M is smaller than the reference number, the L transmit antennas 14 may be selected as in the second embodiment. In such a case, when the number M of combinations is greater than or equal to the reference number and is relatively large, the antenna with which the power is maximized is selected as the first antenna and the second and subsequent transmit antennas 14 are sequentially selected so as to satisfy the antenna selection criterion. When the number M of combinations is smaller than the reference number and is relatively small, the first and second inverse-matrix determining units 25 and 26 determine inverse matrices for all combinations for selection of L antennas from the N antennas and select the L antennas.

As another embodiment, the base station 10 may include an antenna selector and first and second inverse-matrix determining units. In such a case, for example, the mobile station 20 transmits information regarding the channel matrices to the base station 10, and the antenna selector 24 and the first and second inverse-matrix determining units 25 and 26 use the information to determine inverse matrices of the channel matrices.

Seventh Embodiment

A seventh embodiment will be described next with reference to FIG. 13. A wireless communication system according to a seventh embodiment is different in only the processing of the antenna selector 24 from the wireless communication system 1 according to the first embodiment. Descriptions of other configurations are omitted hereinafter.

Figure 13:
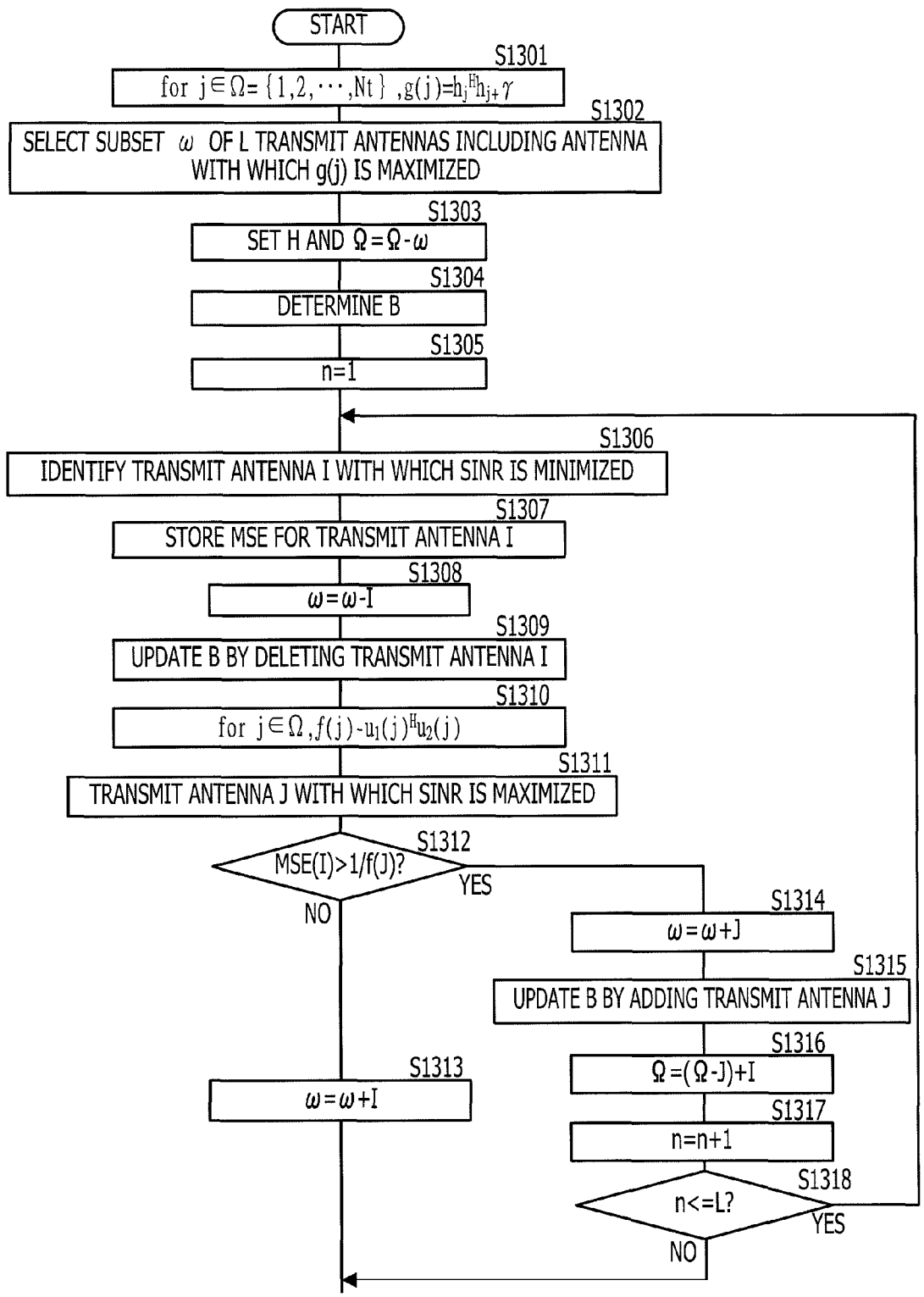
FIG. 13 is a flowchart illustrating antenna selection processing in a seventh embodiment.

FIG. 13 is a flowchart illustrating antenna selection processing in the seventh embodiment. In the seventh embodiment, first, in step S1301, with respect to each transmit antenna j of all transmit antennas $\Omega(j\in\Omega=\{1, 2, \ldots, N_t\})$, the antenna selector 24 determines a power value g(j) by using equation (11) noted above.

Next, in step S1302, the antenna selector 24 selects a subset ω of L transmit antennas 14 including a transmit antenna with which the power value g(j) is maximized. For example, the L transmit antennas 14 may be arbitrarily selected or may be sequentially selected according to power values g(j).

In step S1303, the antenna selector 24 sets a channel matrix H for the subset ω and a set $\Omega(=\Omega-\omega)$ of the remaining transmit antennas 14.

In step S1304, the antenna selector 24 determines an inverse matrix B of the channel matrix H for the subset ω. In step S1305, the antenna selector 24 sets "1" for the count value n.

In step S1306, the antenna selector 24 identifies, of the subset ω, a transmit antenna I with which the SINR is minimized, based on the inverse matrix B for the subset ω and in accordance with equation (30) below.

$$I = \underset{i\in\omega}{\mathrm{argmax}}(B_{i,i}) \tag{30}$$

Equation (30) corresponds to identifying, of the transmit antennas i included in the subset ω, the transmit antenna I with which the MSE indicated by diagonal elements in the inverse matrix B is maximized.

In step S1307, the antenna selector 24 stores the MSE(I) $=B_{I,I}$ for the identified transmit antenna I. In step S1308, the antenna selector 24 deletes the transmit antenna I from the subset ω. In step S1309, using equation (24) noted above, the antenna selector 24 updates the inverse matrix B by performing processing for deleting an element corresponding to the transmit antenna I. In step S1310, the antenna selector 24 selects the transmit antennas one by one from the set ω of the remaining transmit antennas 14, and determines f(j) for the antenna set to which the selected transmit antenna is added, by using equations (19) to (21) noted above. In step S1311, the antenna selector 24 identifies a transmit antenna 3 with which the SINR is maximized.

In step S1312, the antenna selector 24 determines whether or not the MSE(I) for the transmit antenna I is larger than an MSE(J)=1/f(J) for the transmit antenna J.

For MSE(I)≦1/f(J), e.g., for NO in step S1312, the process proceeds to step S1313. In step S1313, the antenna selector 24 returns the deleted transmit antenna I to the subset ω and returns the element corresponding to the transmit antenna I to the inverse matrix B. Thereafter, the antenna selection processing ends.

For MSE(I)>1/f(J), for YES in step S1312, the process proceeds to step S1314. In step S1314, the antenna selector 24 adds the transmit antenna 3 to the subset ω. In step S1315, using equation (25) noted above, the antenna selector 24 updates the inverse matrix B by performing processing for adding an element corresponding to the transmit antenna J. In step S1316, the antenna selector 24 sets a set $\Omega=(\Omega-J)+I$ of the remaining transmit antennas 14. In step S1317, the antenna selector 24 sets "n+1" for the count value n. In step S1318, the antenna selector 24 determines whether or not the count value n is smaller than or equal to L. For n≦L (YES in step S1318), the process returns to step S1306 and the antenna selector 24 repeats the processing. For n>L (NO in step S1318), the antenna selector 24 ends the antenna selection processing.

According to the seventh embodiment, it is possible to select an appropriate combination of the transmit antennas 14 in a short processing time with respect to the wireless communication system 1 that is capable of performing MIMO communication.

Although g(j) is determined in step S1301 and L antennas containing the maximum value of g(j) are selected in step S1302 in the seventh embodiment, the arrangement may also be such that arbitrary L antennas are selected without determination of g(j) and processing in steps S1303 to S1318 is performed.

Although I is returned to the set Q of the remaining transmit antennas 14 in step S1316 in the seventh embodiment, the processing may be continued only by deleting without returning I.

Eighth Embodiment

An eighth embodiment will be described next with reference to FIG. 14. A wireless communication system according to an eighth embodiment is different in only the processing of the antenna selector 24 from the wireless communication system 1 according to the first embodiment. Descriptions of other configurations are omitted hereinafter.

Figure 14:
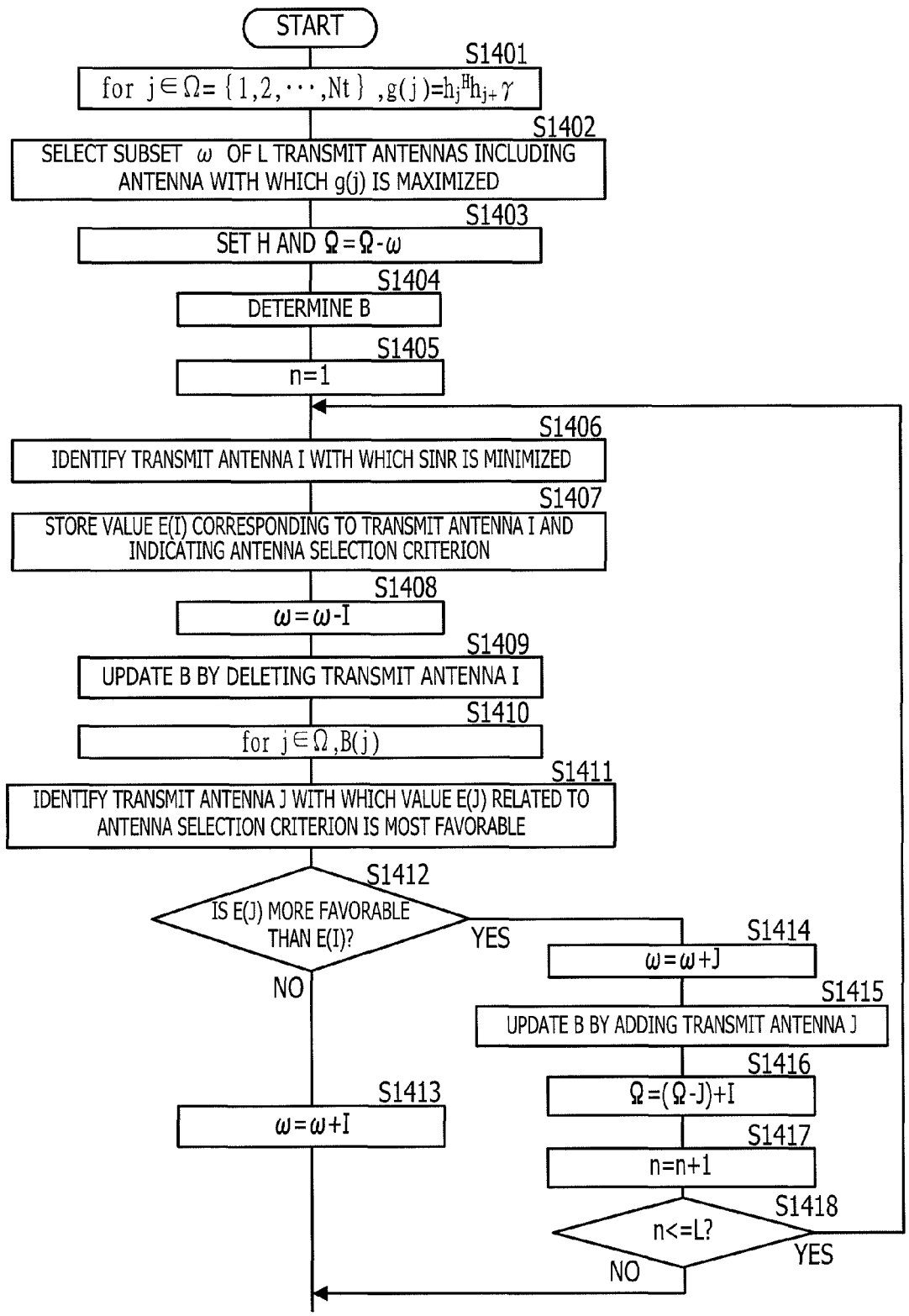
FIG. 14 is a flowchart illustrating antenna selection processing in an eighth embodiment.

FIG. 14 is a flowchart illustrating antenna selection processing in the eighth embodiment. In the eighth embodiment, first, in step S1401, with respect to each transmit antenna j of all transmit antennas $\Omega$(where $j\in\omega=\{1, 2, \ldots, N_t\}$), the antenna selector 24 determines a power value g(j) by using equation (11) noted above, as in the seventh embodiment.

In step S1402, the antenna selector 24 selects a subset ω of L transmit antennas 14 including a transmit antenna with which the power value g(j) is maximized. For example, the L transmit antennas 14 may be arbitrarily selected or may be sequentially selected according to power values g(j).

In S1403, the antenna selector 24 sets a channel matrix H for the subset ω and a set $\Omega(=\Omega-\omega)$ of the remaining transmit antennas 14. In step S1404, the antenna selector 24 determines an inverse matrix B of the channel matrix H for the subset ω. In step S1405, the antenna selector 24 sets "1" for the count value n.

In step S1406, the antenna selector 24 identifies, of the subset ω, a transmit antenna I with which the SINR is minimized, based on the inverse matrix B for the subset ω and in accordance with equation (30) noted above. In step S1407, the antenna selector 24 stores a value E(I) corresponding to the identified transmit antenna I and indicating an antenna selection criterion as described in the first embodiment. Specifically, the antenna selection criterion is, for example, a criterion A of minimizing the diagonal sum in the inverse matrix, a criterion B of minimizing the diagonal product in the inverse matrix, a criterion C of minimizing the maximum value of values of diagonal elements in the inverse matrix, or a criterion D of maximizing the total sum of the inverted values of values of diagonal elements in the inverse matrix.

In step S1408, the antenna selector 24 deletes the transmit antenna I from the subset ω. In step S1409, using equation (24) noted above, the antenna selector 24 updates the inverse matrix B by performing processing for deleting an element corresponding to the transmit antenna I. In step S1410, the antenna selector 24 selects the transmit antennas one by one from the set Ω of the remaining transmit antennas 14, and determines B(j) for the antenna set to which the selected transmit antenna is added, by using equations (12) to (16) noted above. In step S1411, based on the inverse matrix B (j), the antenna selector 24 identifies a transmit antenna J with which E(j) related to the antenna selection criterion is most favorable.

In step S1412, the antenna selector 24 determines whether or not E(J) for the transmit antenna 3 is more favorable than E(I) for the transmit antenna I. More specifically, for example, when the selection criterion A, B, or C is used, E(J)>E(I) indicates that (J) is more favorable than E(I), and when the selection criterion D is used, E(J)<E(I) indicates that (3) is more favorable than E(I).

When E(J) is not favorable than or is the same as E(I), NO in step S1412, the process proceeds to step S1413. In step S1413, the antenna selector 24 returns the deleted transmit antenna I to the subset w and returns the element corresponding to the transmit antenna I to the inverse matrix B. Thereafter, the antenna selection processing ends.

When E(J) is more favorable than E(I), YES in step S1412, the process proceeds to step S1414. In step S1414, the antenna selector 24 adds the transmit antenna J to the subset ω. In step S1415, using equation (25) noted above, the antenna selector 24 updates the inverse matrix B by performing processing for adding an element corresponding to the transmit antenna J. In step S1416, the antenna selector 24 sets a set Ω=(Ω−J)+I of the remaining transmit antennas 14. In step S1417, the antenna selector 24 sets "n+1" for the counter value n. In step S1418, the antenna selector 24 determines whether or not the count value n is smaller than or equal to L. For n≦L (YES in step S1418), the process returns to step S1406 and the antenna selector 24 repeats the processing. For n>L (NO in step S1418), the antenna selector 24 ends the antenna selection processing.

According to the eighth embodiment, it is possible to select an appropriate combination of the transmit antennas 14 in a short processing time with respect to the wireless communication system 1 that is capable of performing MIMO communication.

Although g(j) is determined in step S1401 and L antennas containing a maximum value of g(j) are selected in step S1402 in the eighth embodiment, the arrangement may also be such that arbitrary L antennas are selected without determination of g(j) and processing in steps S1403 to S1418 is performed.

Although I is returned to the set Ω of the remaining transmit antennas 14 in step S1416 in the eighth embodiment, the processing may be continued by deleting 3 without returning I.

Although an example of one base station and one mobile station has been described in the first to eighth embodiments, the present disclosure is not limited thereto. For example, concerning the first to fifth and seventh to eighth embodiments, the present disclosure may also be applied to selecting a user who performs uplink communication in multi-user MIMO system. And, for example, concerning the sixth embodiment, the present disclosure may also be applied to selecting a user who performs downlink communication in multi-user MIMO system.

The wireless communication system in each of the first to eighth embodiments may also be used as a subcarrier system for an OFDM (orthogonal frequency division multiplexing) wireless communication system.

What is claimed is:

1. A wireless communication system that is capable of performing multiple-input multiple-output communication using a wireless communication apparatus having N antennas, where N is an integer of 2 or greater, the system comprising:
    a first inverse-matrix determining unit that determines, using a channel matrix for a first antenna selected from the N antennas, a first inverse matrix of the channel matrix;
    a second inverse-matrix determining unit that determines, with respect to an (n+1)th antenna selected from antennas other than the first to nth antennas already selected from the N antennas, where n=1, 2, . . . , up to L−1, and L represents a given number of antennas used and is an integer of 2 or greater and smaller than or equal to N, a second inverse matrix of a channel matrix for a group of the first to (n+1)th antennas, by performing computation using a value from one of the first inverse matrix and the second inverse matrix for a group of the first to nth antennas;
    an antenna selector that determines, from a plurality of combinations of the L antennas selected from the N antennas, a combination with which an inverse matrix value determined by the first and second inverse-matrix determining units satisfies an antenna selection criterion, as the L antennas used for communication; and
    an antenna selection controller that executes control for performing communication using the L antennas selected by the antenna selector.

2. A wireless communication method that is capable of performing multiple-input multiple-output communication using a wireless communication apparatus having N antennas, where N is an integer of 2 or greater, the method comprising:
    performing first inverse-matrix determining processing which determines, using a channel matrix for a first antenna selected from the N antennas, a first inverse matrix of the channel matrix;
    performing second inverse-matrix determining processing which determines, with respect to an (n+1)th antenna selected from antennas other than the first to nth antennas already selected from the N antennas, where n=1, 2, . . . , up to L−1, and L represents a given number of antennas for use and is an integer of 2 or greater and smaller than or equal to N, a second inverse matrix of a channel matrix for a group of the first to (n+1)th antennas, by performing computation using a value from one of the first inverse matrix and the second inverse matrix for a group of the first to nth antennas; and
    performing communication using, from a plurality of combinations of the L antennas selected from the N antennas, a combination of L antennas with which an inverse matrix value determined in the first and second inverse-matrix determining processing satisfies an antenna selection criterion.

3. The wireless communication method according to claim 2, wherein the communication is performed using the combination of L antennas obtained by repeatedly performing processing of: selecting, as candidates for the (n+1)th antenna, candidate antennas one by one from the antennas other than the first to nth antennas already selected from the N antennas; determining, in the second inverse-matrix determining processing, the second inverse matrix for the group of the first to (n+1)th antennas with respect to each of the candidate antennas; and determining, as the (n+1)th antenna, the candidate antenna with which a value from the second inverse matrix satisfies a first antenna selection criterion.

4. The wireless communication method according to claim 3, wherein the first antenna selection criterion is one of a criterion of minimizing a value of a last diagonal element in the inverse matrix, a criterion of minimizing a diagonal sum in the inverse matrix, a criterion minimizing a diagonal product in the inverse matrix, a criterion of maximizing a total sum of inverted values of values of diagonal elements in the inverse matrix, and a criterion of minimizing a maximum value of values of diagonal elements in the inverse matrix.

5. The wireless communication method according to claim 2, wherein an antenna with which power is maximized is selected, as the first antenna, from the N antennas.

6. The wireless communication method according to claim 2, wherein the communication is performed using a combination of L antennas with which the inverse matrix value determined in the first and second inverse-matrix determining processing satisfies a second antenna selection criterion, with respect to a plurality of combinations for the L antennas selected from the N antennas.

7. The wireless communication method according to claim 6, wherein, when determining an inverse matrix of a channel matrix for each combination of the L antennas selected from the N antennas, an inverse matrix of a channel matrix already determined with respect to another combination is used.

8. The wireless communication method according to claim 7 comprising, when determining the inverse matrix of the channel matrix with respect to one combination of the L antennas selected from the N antennas, replacing an element corresponding to an antenna that is different from the one combination and the another combination in the inverse matrix of the channel matrix already determined with respect to the another combination.

9. The wireless communication method according to claim 6, wherein, with respect to one combination of the L antennas selected from the N antennas, when determining the second inverse matrix of the channel matrix for the group of the first to (n+1)th antennas in the second inverse-matrix determining processing, the inverse matrix of the channel matrix for the group of the first to nth antennas already determined with respect to the another combination in the first and second inverse-matrix determining processing is used.

10. The wireless communication method according to claim 6, wherein the second antenna selection criterion is one of a criterion of minimizing a diagonal sum in the inverse matrix, a criterion minimizing a diagonal product in the inverse matrix, a criterion of maximizing a total sum of inverted values of values of diagonal elements in the inverse matrix, and a criterion of minimizing a maximum value of values of diagonal elements in the inverse matrix.

11. The wireless communication method according to claim 2, wherein, when the number M of all combinations of the L antennas selected from the N antennas is greater than or equal to a given reference number, the communication is performed using a combination of L antennas obtained by repeatedly performing: selecting, as the first antenna, the antenna at which the power is maximized; selecting, as candidates for the (n+1)th antenna, candidate antennas one by one from the antennas other than the first to nth antennas already selected from the N antennas; determining, in the second inverse-matrix determining processing, a second inverse matrix for a group of the first to (n+1)th antennas with respect to each of the selected candidate antennas; and determining, as the (n+1)th antenna, the candidate antenna with which a value from the second inverse matrix satisfies a first antenna selection criterion; and wherein, when the number M of combinations is smaller than the given reference number, the communication is performed using a combination of the L antennas with which the inverse matrix value determined in the first and second inverse-matrix determining processing satisfies a second antenna selection criterion, with respect to all combinations of the L antennas selected from the N antennas.

12. The wireless communication method according to claim 11, wherein, with respect to one combination of the L antennas selected from the N antennas, when determining the second inverse matrix of the channel matrix for the group of the first to (n+1)th antennas in the second inverse-matrix determining processing, the inverse matrix of the channel matrix for the group of the first to nth antennas already determined with respect to another combination in the first and second inverse-matrix determining processing is used.

13. The wireless communication method according to claim 2, wherein the inverse matrix that satisfies the antenna selection criterion is used as an inverse matrix used in one of minimum mean square error decoding and zero forcing linear decoding used for processing a reception signal.

14. The wireless communication method according to claim 2, wherein an inverse matrix used in one of minimum mean square error decoding and zero forcing linear decoding used for processing a reception signal is determined using the first and second inverse-matrix determining processing.

15. A wireless communication apparatus that is used in a wireless communication system capable of performing multiple-input multiple-output communication and that performs communication with another wireless communication apparatus having N antennas, where N is an integer of 2 or greater, the wireless communication apparatus comprising:

a first inverse-matrix determining unit that determines, using a channel matrix for a first antenna selected from the N antennas, a first inverse matrix of the channel matrix;

a second inverse-matrix determining unit that determines, with respect to an (n+1)th antenna selected from antennas other than the first to nth antennas already selected from the N antennas, where n=1, 2, . . . , up to L−1, and L represents a given number of antennas used and is an integer of 2 or greater and smaller than or equal to N, a second inverse matrix of a channel matrix for a group of the first to (n+1)th antennas, by performing computation using a value from one of the first inverse matrix and the second inverse matrix for a group of the first to nth antennas;

an antenna selector that determines, from a plurality of combinations of the L antennas selected from the N antennas, a combination with which an inverse matrix value determined by the first and second inverse-matrix determining units satisfies an antenna selection criterion, as the L antennas used for the communication; and a transmitting unit that transmits, to the wireless communication apparatus having the N antennas, information regarding the L antennas selected by the antenna selector.

16. A wireless communication apparatus that is used in a wireless communication system capable of performing multiple-input multiple-output communication and that has N antennas, where N is an integer of 2 or greater, the wireless communication apparatus comprising:

a first inverse-matrix determining unit that determines, using a channel matrix for a first antenna selected from the N antennas, a first inverse matrix of the channel matrix;

a second inverse-matrix determining unit that determines, with respect to a (n+1)th antenna selected from antennas other than the first to nth antennas already selected from the N antennas, where n=1, 2, . . . , up to L−1, and L represents a given number of antennas used and is an integer of 2 or greater and smaller than or equal to N, a second inverse matrix of a channel matrix for a group of the first to (n+1)th antennas, by performing computation using a value from one of the first inverse matrix and the second inverse matrix for a group of the first to nth antennas;

an antenna selector that determines, from a plurality of combinations of the L antennas selected from the N antennas, a combination with which an inverse matrix value determined by the first and second inverse-matrix determining units satisfies an antenna selection criterion, as the L antennas used for communication; and an antenna selection controller that executes control for performing communication using the L antennas selected by the antenna selector.

* * * * *